(12) United States Patent
Ku et al.

(10) Patent No.: US 8,782,591 B1
(45) Date of Patent: Jul. 15, 2014

(54) PHYSICALLY AWARE LOGIC SYNTHESIS OF INTEGRATED CIRCUIT DESIGNS

(71) Applicant: Cadence Design Systems, Inc., San Jose, CA (US)

(72) Inventors: Tsuwei Ku, Cupertino, CA (US); David Seibert, Mountain View, CA (US); Huey-Yih Wang, Cupertino, CA (US); Hua Song, Saratoga, CA (US); Kai Zhu, Palo Alto, CA (US); Yu-Fang Chung, Cupertino, CA (US); Ankush Sood, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/732,364

(22) Filed: Dec. 31, 2012

(51) Int. Cl.
*G06F 17/50* (2006.01)
(52) U.S. Cl.
USPC ............ 716/134; 716/103; 716/108; 716/113
(58) Field of Classification Search
USPC ................................. 716/103, 108, 113, 134
See application file for complete search history.

(56) References Cited

U.S. PATENT DOCUMENTS

| | | | | |
|---|---|---|---|---|
| 5,126,950 A * | 6/1992 | Rees et al. | | 716/136 |
| 5,673,420 A * | 9/1997 | Reyes et al. | | 716/106 |
| 6,170,080 B1 * | 1/2001 | Ginetti et al. | | 716/104 |
| 6,539,536 B1 * | 3/2003 | Singh et al. | | 716/102 |
| 6,735,750 B2 * | 5/2004 | Korzyniowski et al. | | 716/112 |
| 6,836,877 B1 * | 12/2004 | Dupenloup | | 716/103 |
| 7,080,334 B2 * | 7/2006 | Fan et al. | | 716/103 |
| 7,373,615 B2 * | 5/2008 | Dougherty et al. | | 716/104 |
| 7,429,880 B2 * | 9/2008 | Rana et al. | | 326/98 |
| 7,441,210 B2 * | 10/2008 | Lahner et al. | | 716/104 |
| 8,024,695 B2 * | 9/2011 | Reis et al. | | 716/132 |
| 8,407,650 B1 * | 3/2013 | Avidan et al. | | 716/129 |
| 2011/0010680 A1 * | 1/2011 | Vuillod et al. | | 716/104 |

* cited by examiner

*Primary Examiner* — Naum Levin
(74) *Attorney, Agent, or Firm* — Alford Law Group, Inc.; Tobi C. Clinton

(57) ABSTRACT

In one embodiment of the invention, a method of synthesizing physical gates from register transfer logic code for an integrated circuit design is disclosed. The method includes reading a register transfer level (RTL) input file describing an integrated circuit design; parsing and translating the RTL input file into a plurality of Boolean logic equations; translating the plurality of Boolean logic equations into a plurality of logic primitives; placing the plurality of logic primitives into a floorplan of the integrated circuit design, wherein the placement of the plurality of logic primitives defines wire interconnects; and optimizing each of the plurality of Boolean logic equations in response to wire costs and wire timing delays.

27 Claims, 23 Drawing Sheets

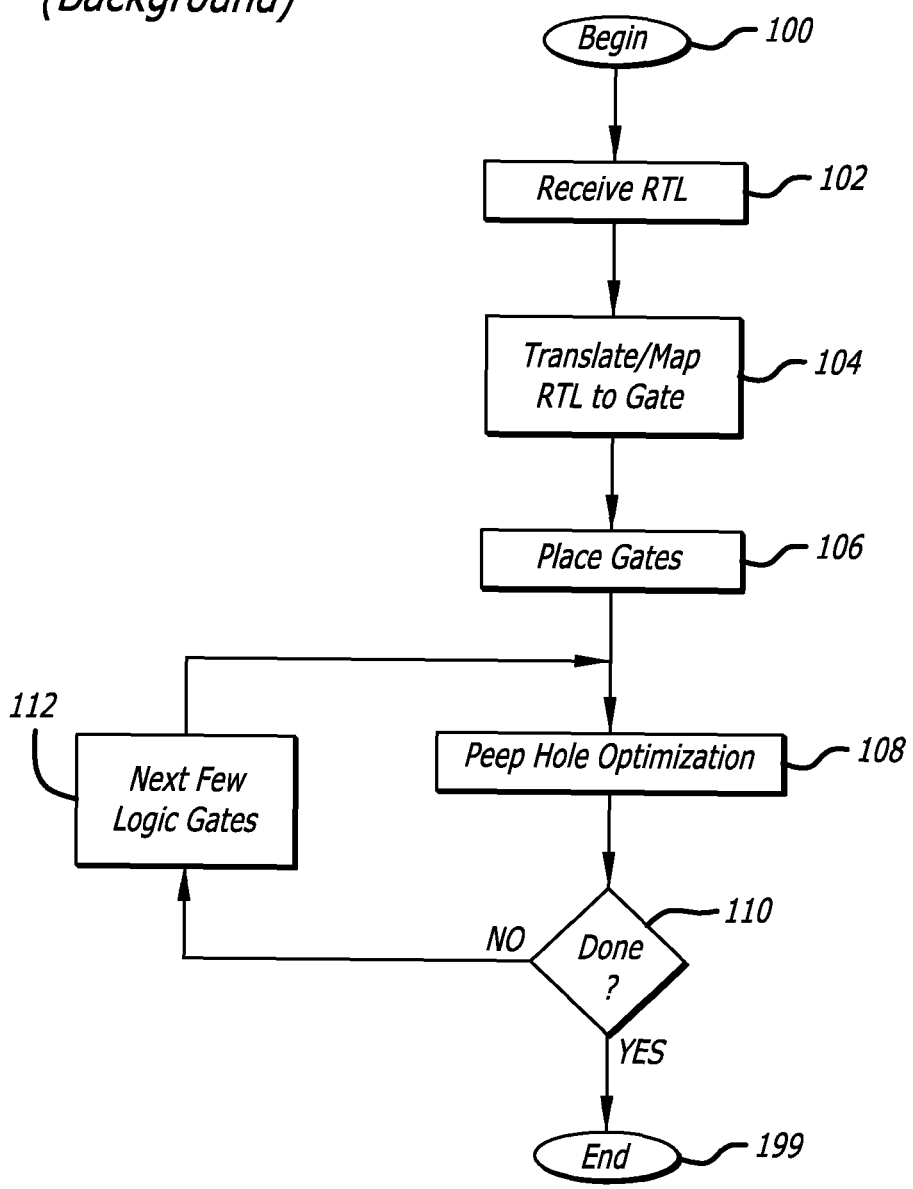

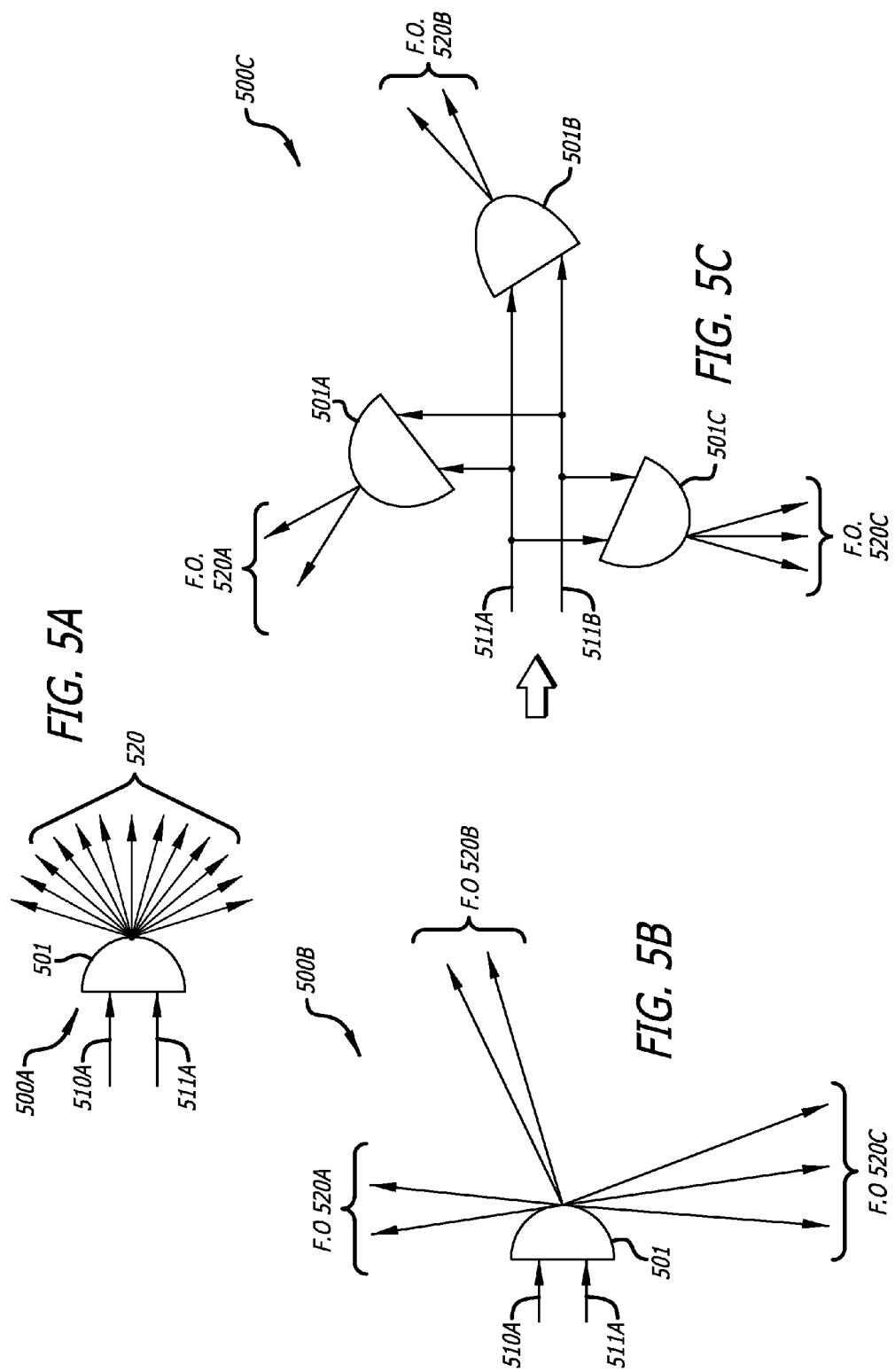

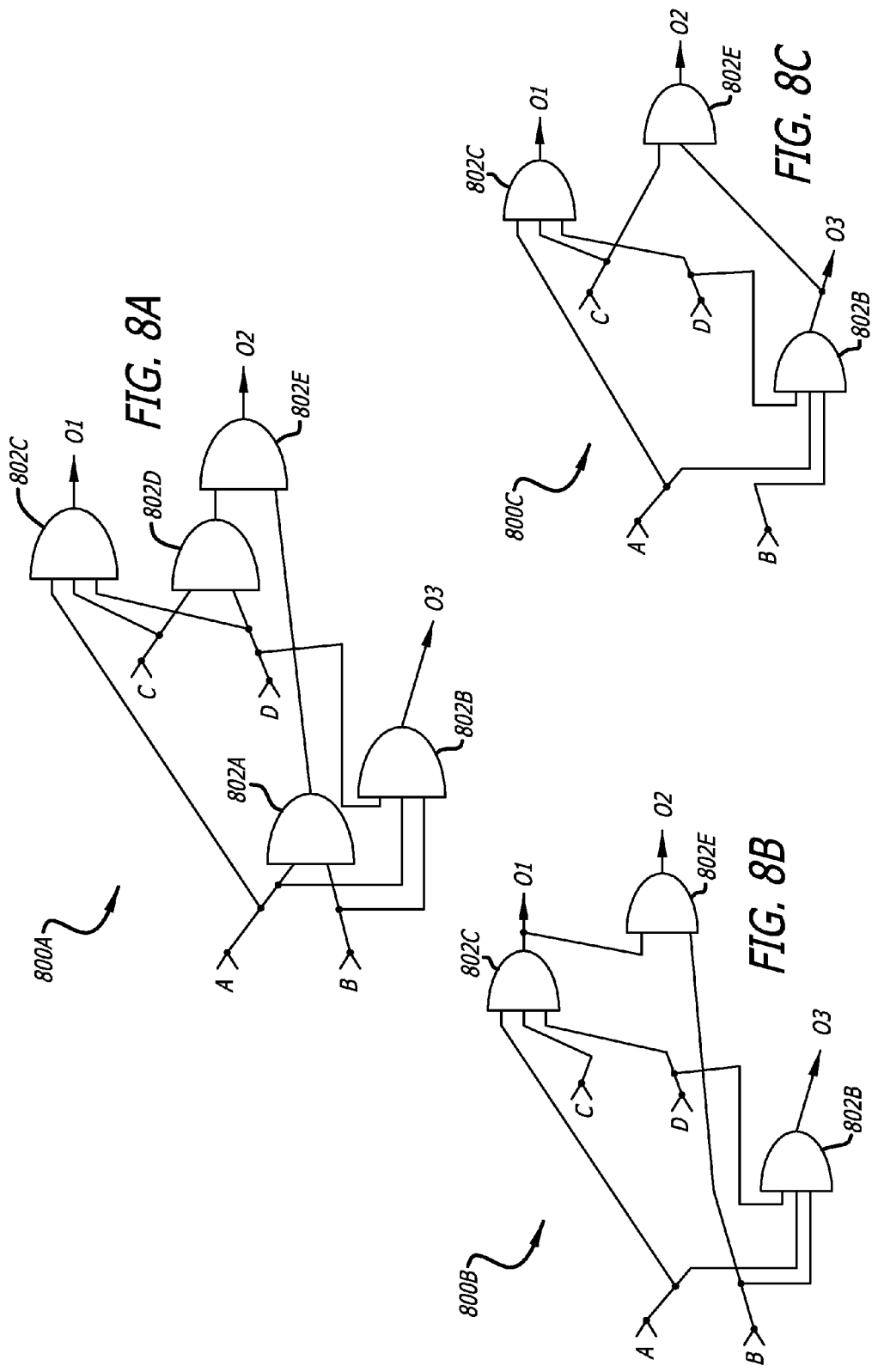

PHYSICALLY AWARE LOGIC SYNTHESIS OF INTEGRATED CIRCUIT DESIGNS

FIELD

The embodiments of the invention relate generally to the physical synthesis of logic circuits for integrated circuit designs.

BACKGROUND

In integrated circuits, the transistor channel lengths have become smaller and power supplies have been reduced so that switching time delays between adjacent logic gates has been significantly reduced. The logic gate has been reduced so much so that the parasitic wire timing delay from parasitics of wire interconnect and the buffer timing delay from data buffers are becoming a dominating timing delay factor in critical data or signal paths.

Many critical data or signal paths are caused by the physical location of large circuits known as hard macros. A hard macro is a predefined circuit by a third party that has a predefined layout, such as a random access memory. Often wires have to cross over each other or be extended long distances for other circuits to make connections to a hard macro. As the wire lengths of the wire interconnect increase, resistance increases and a signal's timing delay may increase between terminals. With wires crossing over, via contacts are needed in the physical layout to avoid shorts to each other. The via contacts are not ideal contacts and introduce some added resistance that can increase signal delay between two terminals.

Typical incremental optimization techniques employed during synthesis are used at the gate level and without consideration of physical placement. Moreover, incremental optimization techniques analyze a few logic gates at a time and may not discover optimizations of blocks with larger numbers of logic gates.

It is desirable that during logic synthesis of an RTL netlist for integrated circuit designs, that in additional to the functional logic, placement information of circuits be considered in advance and carried through the IC design flow to the physical placement step, in order to provide improved convergence of the physical design.

BRIEF SUMMARY

The embodiments of the invention are summarized by the claims that follow below.

BRIEF DESCRIPTIONS OF THE DRAWINGS

Various embodiments of the present invention taught herein are illustrated by way of example, and not by way of limitation, in the Figures of the accompanying drawings, in which:

FIG. 1 is a background Figure of a flow chart of a typical logic synthesis process.

FIGS. 5A-5C are schematic diagrams of circuits to illustrate another aspect of physical aware structuring.

FIGS. 8A-8C are schematic diagrams of circuits to illustrate another aspect of physical aware structuring.

Figure 2A:
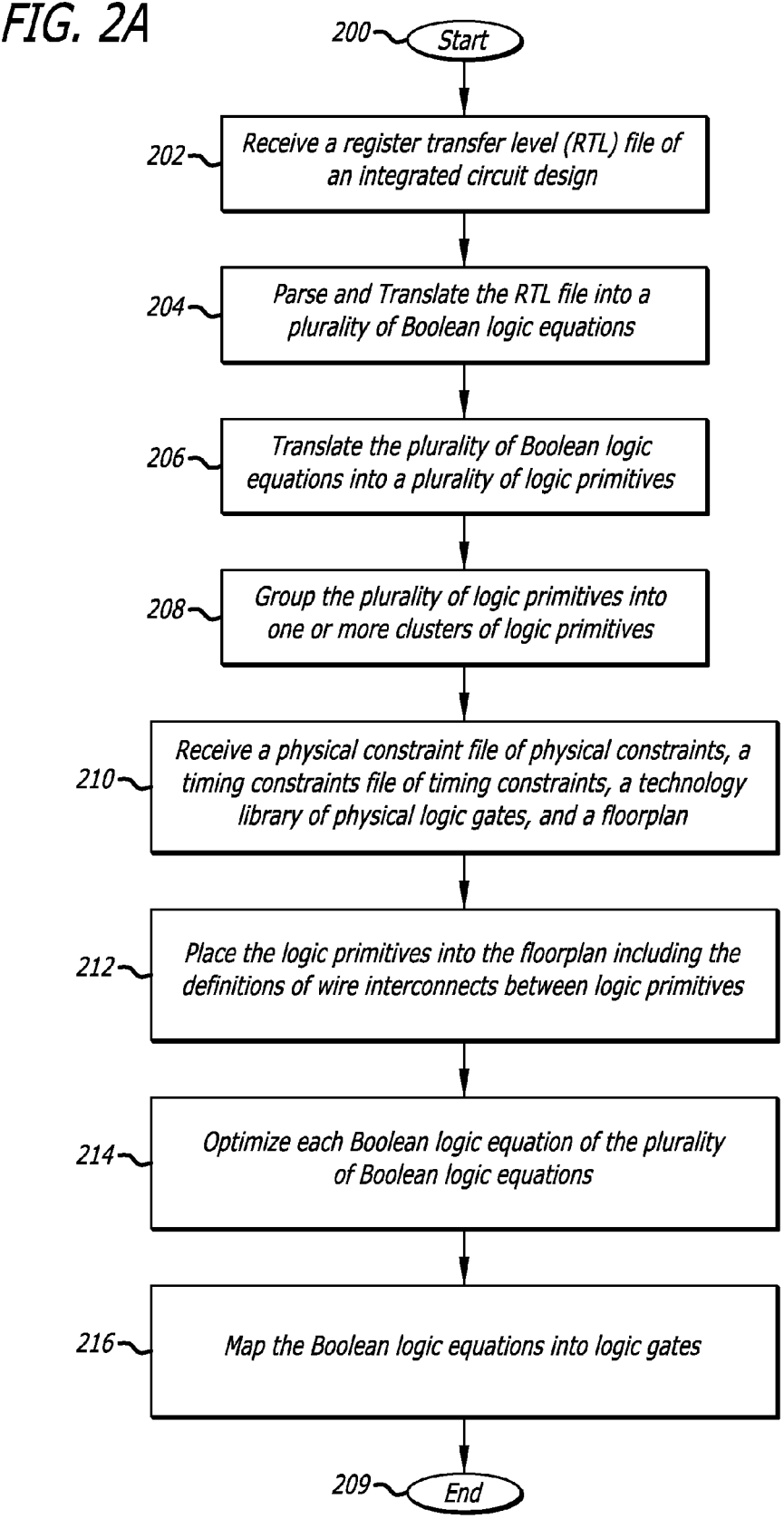
FIG. 2A is a flow chart of the process for physically aware circuit synthesis.

It will be recognized that some or all of the Figures are for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Introduction

The embodiments of the invention includes a method, apparatus and system for physically aware logic synthesis of integrated circuit designs.

Referring now to FIG. 1, a flow chart of a typical logic synthesis process is illustrated that is performed without concern for physical aspects of placement and wire routing in an integrated circuit design. Placement of the logic gates and routing of the interconnect are separate processes that traditionally follow after a circuit is synthesized. The process starts at process block 100 and goes to process block 102.

At process block 102, a register transfer level (RTL) input file of an integrated circuit design, constraints, and technology file is received by a typical logic synthesis tool without any floor planning information. The process then goes to process block 104.

At process block 104, the RTL input file is translated and mapped into a plurality of physical logic gates without concern for placement and routing. The process then goes to process block 106.

At process block 106, the logic gates are placed into a physical layout of an integrated circuit design. The process then goes to process block 108.

At process block 108, a peep hole placement and logic optimization process occurs using a few logic gates. The peep hole placement and logic optimization process does not look at the bigger placement picture to determine if clusters of many logic gates could be optimized together. With only a few gates selected, the process may require repeating over and over again until all logic gates may have been analyzed. To that end, the process then goes to process block 110.

At process block 110, a determination is made as to whether or not substantially all the logic gates have been considered for placement and logic optimization. If so, the process goes to process block 199 and ends. If not, the process goes to process block 112, where the next couple of logic gates are selected for consideration in the peep hole placement and logic optimization process. The process then goes back to process block 108 and repeats the peep hole placement and logic optimization process with a select few gates.

The embodiments of the invention disclosed herein are directed to physically aware logic synthesis of integrated circuit designs. Briefly physically aware logic synthesis translates a register transfer level (RTL) input file describing an integrated circuit design into a plurality of Boolean logic equations which are in turn translated into a plurality of logic primitives. The plurality of logic primitives are placed into a floorplan of the integrated circuit design that defines the wire interconnects between them. In response to wire timing delays associated with the defined wire interconnects, the physically aware logic synthesis further optimizes each of the plurality of Boolean logic equations and updates the logic primitives accordingly as needed.

FIGS. 2A-2H and the description thereof disclose general aspects of physically aware logic synthesis. FIGS. 3A-3E, 4A-4D, 5A-5C, 6A-6C, 7A-7D, 8A-8C, 9A-9C, 10A-10C, 12A-12B, 13A-13B and the description thereof disclose more specific aspects of physically aware logic synthesis.

FIGS. 3A-3E, 4A-4D, 5A-5C, 6A-6C, 7A-7D, 8A-8C, 12A-12B and the description thereof disclose aspects of physical aware structuring for physically aware logic synthesis. FIGS. 9A-9C, 10A-10C, 13A-13B and the description thereof disclose aspects of physical aware mapping for physically aware logic synthesis.

Referring now to FIG. 2A, a flow chart of a process of physically aware logic synthesis is illustrated. The process starts at process block 200 and then goes to process block 202.

At process block 202, a register transfer level (RTL) input file of an integrated circuit design is received by a physically aware logic synthesis tool. The process then goes to process block 204.

At process block 204, the RTL input file is parsed and translated into a plurality of Boolean logic equations. The RTL input file has if, then, and else statements to define the IC design. These are translated into logic equations with NOT logic expressions, AND logic expressions, OR logic expressions, and XOR logic expressions. Consider a two input multiplexor, for example, with A and B inputs, an S select input, and a Y output. In RTL, a multiplexer may be represented by the statement, If S=1 then Y=A else Y=B. This RTL representation may be translated into the Boolean logic equation of Y=(A AND S) OR (A AND NOT S), for example. The process then goes to process block 206.

At process block 206, the plurality of Boolean logic equations are further translated into a plurality of logic primitives. The logic primitives are logic functions such as AND and OR logic functions but lack the physical aspects of a transistor level gate. A logic primitive is also referred to herein as a generic gate. Sequential or clock logic primitives, which are mapped into a D flip flop or a latch for example, may also be included in the translation to meet timing constraints. A technology library, including cells defining the physical layout of gates and transistor structures for a given silicon foundry and semiconductor manufacture, goes unused for the most part during this process. Area information of the gates from the technology library may be used during the translation process as well as during the placement process of logic primitives to gain an understanding of wiring congestion and wire lengths. After a translation into logic primitives, an initial physically unaware optimization can take place, such as to eliminate duplicate logic primitives and constants, for example. Subsequently, a physically aware optimization process occurs. The process then goes to process block 208.

At process block 208, two or more of the plurality of logic primitives are grouped into one or more clusters of logic primitives. The process then goes to process block 210.

At process block 210, a physical constraint file of physical constraints, a timing constraints file of timing constraints, a technology library of physical logic gates, and a floorplan are all received. The process then goes to process block 212.

At process block 212, the one or more clusters of logic primitives are placed into the floorplan in response to the Boolean logic equations and the floorplan. The placement of the logic primitives defines the wire interconnects between logic primitives. The placement of the logic primitives in the floorplan may be in further response to the physical constraints. The logic primitives are not the physical circuits of the logic gates, etc. found in the technology library. Thus, the placement of the logic primitives is substantially independent of the technology library. The process then goes to process block 214.

At process block 214, each Boolean logic equation of the plurality of Boolean logic equations is optimized in response to wire costs, such as wire timing delays. The optimization of each Boolean logic equation can vary depending upon the function of the logic, placement of the logic primitives, and the wiring to interconnect the logic primitives. Previously, wire interconnections between terminals of the logic gates were not considered during optimization and the synthesis of an integrated circuit design. Moreover, much information from the technology library is not yet used in the synthesis process. But for cell size and cell area, the optimization of each Boolean logic equation is substantially independent of the technology library. After optimization, the process can go to process block 216.

At process block 216, the Boolean logic equations are mapped into logic gates in response to the wire costs, such as wire timing delays and wire congestion, and further in response to the technology library. After the Boolean logic equations are mapped into logic gates, the process then goes to process block 299 and ends.

A number of processes of the physical aware synthesis are responsive to wire costs, such as wire length, wire timing delays and wire congestion. Wire length, wire timing delays and wire congestion may be goals or constraints in minimizing wire costs during optimization of Boolean logic equation. If available, the physical aware synthesis process may be further responsive to the technology library to a small extent.

Figure 2B:
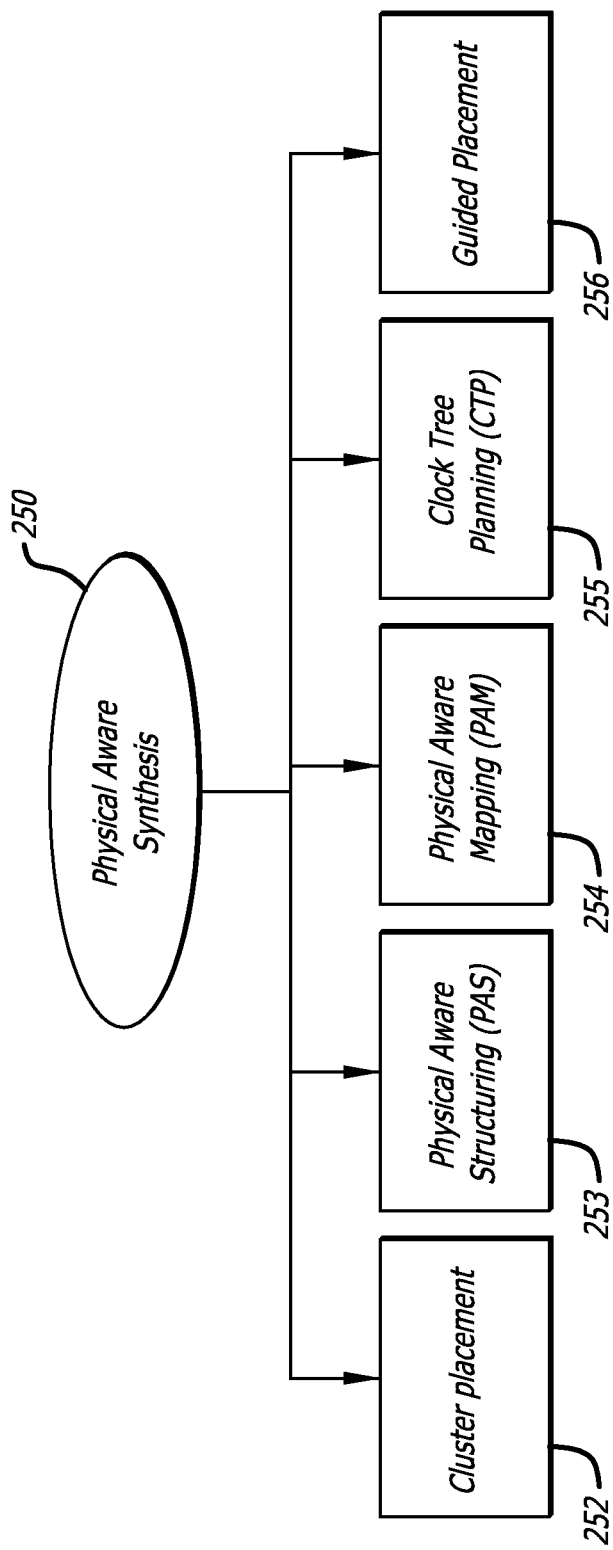
FIG. 2B is a block diagram illustrating one or more general aspects of physically aware circuit synthesis.
Figure 2E:
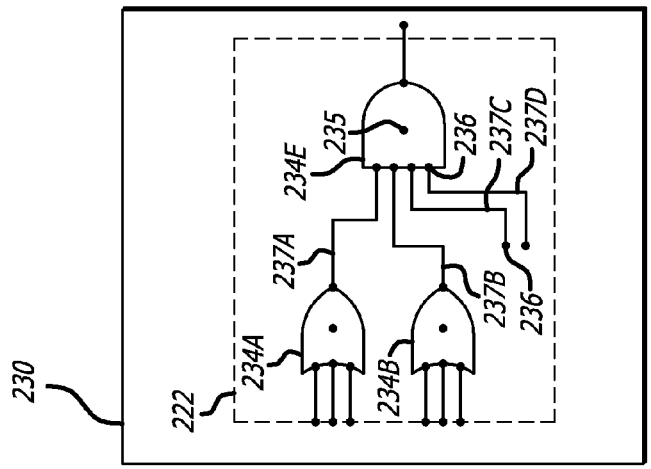
FIG. 2E is a block diagram of an IC layout illustrating an exemplary physically aware mapping of physical logic gates from a technology library in response to the technology independent generic gates and generic wiring illustrated in FIG. 2D.
Figure 2D:
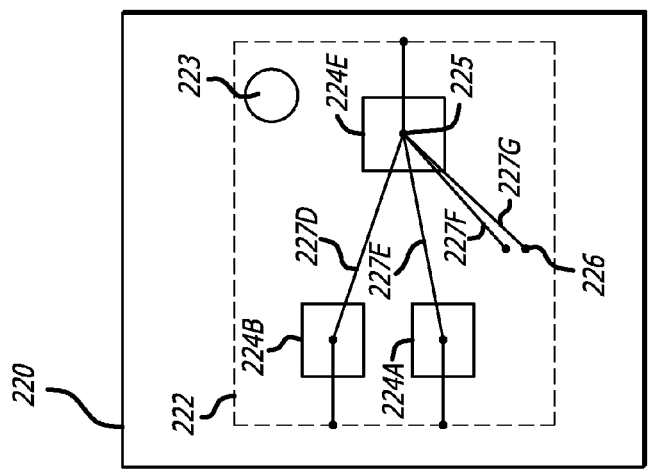
FIG. 2D is a block diagram of the IC floorplan illustrating an exemplary physically aware optimization in response to the technology independent generic gates and generic wiring of the cluster placement illustrated in FIG. 2C.
Figure 2C:
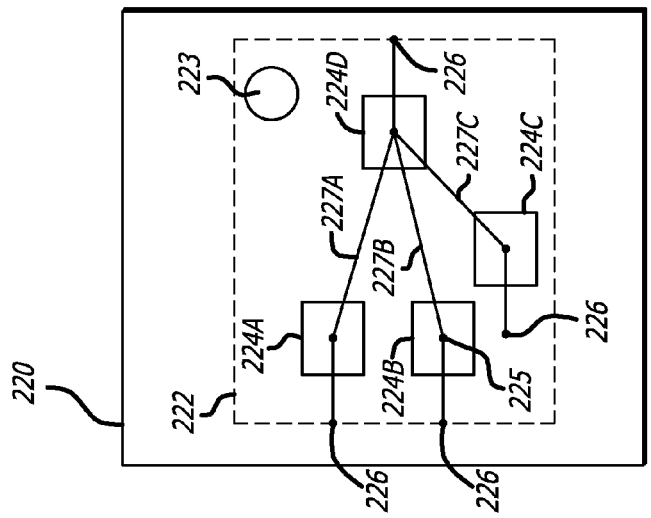
FIG. 2C is a block diagram of an IC floorplan illustrating an exemplary cluster placement of technology independent generic gates and generic wiring between each.
Figure 2H:
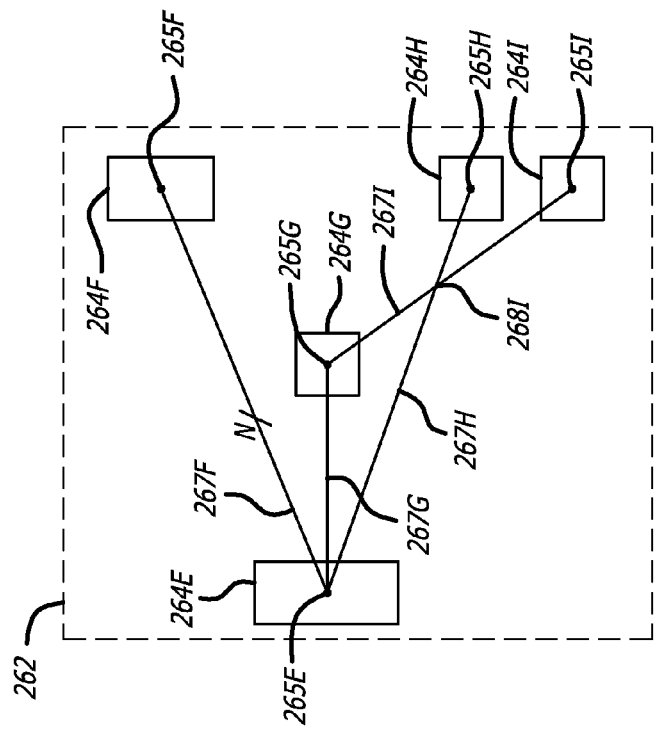
FIG. 2H is a diagram illustrating an exemplary placement of generic gates in an exemplary cluster and computation of wire congestion and total wire length therein.
Figure 2F:
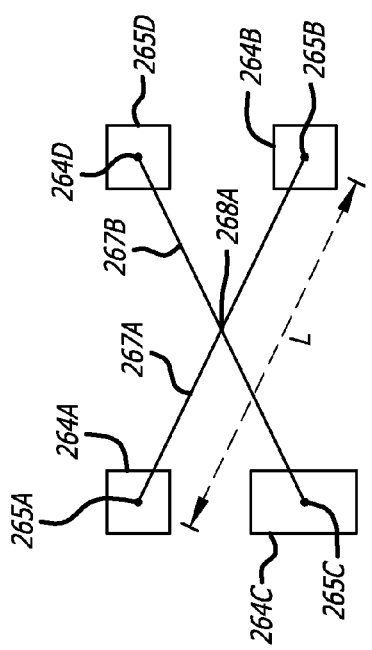
FIG. 2F is a diagram illustrating an exemplary placement of generic gates and exemplary computation of wire length and wire delay time.
Figure 2G:
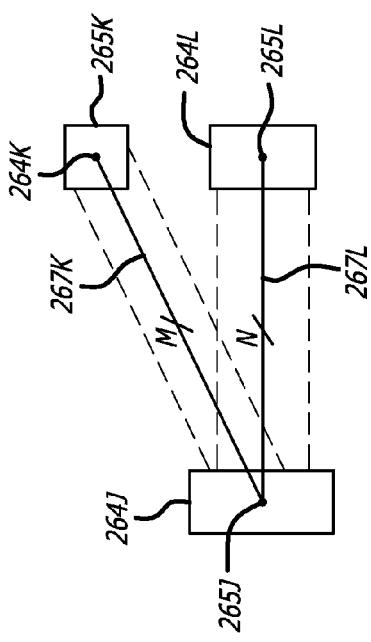
FIG. 2G is a diagram illustrating an exemplary placement of generic gates and computation of wire congestion.

Reference is now made to FIGS. 2F-2G. In FIG. 2F, logic primitives 264A-264D, also referred to as generic gates 264A-264D herein, are illustrated positioned in a floorplan at X-Y coordinates 265A-265D, respectively to analyze wire timing delay. If the wire timing delay is unsatisfactory, the optimization process may possibly move the one or more generic gates to better positions with different coordinates to reduce the wire timing delay and wire costs. The X-Y coordinates 265A-265D in the floorplan are used in proxy of the physical placement information in a physical layout because the physical placement process that considers many other rules, such as layout design rules for example, has not yet occurred with a placement software tool.

Airline 267A is shown routed between the coordinates 265A-265B of the generic gates 265A-265B. Airline 267B is shown routed between the coordinates 265C-265D of the generic gates 265C-265D. Airlines are used in the floorplan to represent the wire routes of wire interconnect in proxy because physical routing has not yet occurred with a routing software tool. The physical routing process considers many other rules, such as layout design rules. Unless noted otherwise, such as in FIG. 2E, the lines drawn between blocks in the drawing figures are airlines representing in proxy the wire interconnects between terminals/pins to analyze the wire costs.

In FIG. 2F, the length of a wire routed between generic gates (GG) 264A-264B is estimated by the distance L along the airline 267A between the X1-Y1 coordinates 265A and the X2-Y2 coordinates 265B. The distance L can be computed as a Manhattan distance in one embodiment of the invention to speed calculations or as the hypotenuse of a right triangle in an alternate embodiment if a more accurate number is desirable. If the Manhattan distance, the distance L is equal to the sum of the magnitude of the difference in X coordinates and the magnitude of the difference in Y coordinates, $L=|X2-X1|+|Y2-Y1|$. If the hypotenuse distance, the distance L is equal to the square root of the sum of the square of the difference in X coordinates and the square of the difference in Y coordinates, $L=[(X2-X1)^2+|Y2-Y1|^2]^{1/2}$.

The distance L and wire congestion of multiple wires can be effected by the size or area of the generic gate that may be placed in the floorplan. The technology library includes the size, width and height, and/or area of cells of the physical gates that may be placed into a layout of an integrated circuit design. The size and/or area of physical gates from the technology library may be annotated to the generic gates in order to better estimate the length and congestion of wire routes between them. For example, the block size of the generic gate 264C is larger than the block of gate 264D indicating a larger cell size and possible more wires being routed between each.

To estimate the wire time delay due to a length of wire routing a predetermined average time per unit length of wire interconnect (Kw) is received from a user or from a technology library, for example. The technology library may include a predetermined average time per unit length of wire interconnect (Kw) which can be read out from it. The portion of the wire delay time from wire length Twdl is computed as the product of the computed length L and the predetermined average time per unit length of wire interconnect (Kw), Twdl=L×Kw. Generic gates may be placed closer together, if possible, to minimize the length L and the wire time delay Twdl.

The wire delay time may be increased if there are wire crossovers. The airlines 267A-267B between the generic gates (GG) 264A-264D cross over each other at a cross over point 268A. To avoid a short in wire interconnect, the wire lines must be routed in different layers at least temporarily near the crossover point which can add additional parasitic resistance and/or capacitance and cause additional delay. Accordingly, a predetermined average time per time crossover (Kco) may be received from a user or form the technology library to adjust wire delay time for cross overs. The portion of the wire delay time due to wire crossover Twdco is computed as the product of the number of wire crossovers (Nco) and the predetermined average time per time crossover (Kco), Twdco=Nco×Kco. Generic gates may be moved, if possible, to avoid wire crossovers and reduce the number of crossovers and the overall wire time delay.

The overall wire time delay for a given wire is the sum of the wire delay time due to wire crossover Twdco and the wire delay time due to wire length Twdl, Twd=Twdl+Twdco. In cases where there are no wire cross overs, Twdco is zero and the total wire delay is Twdl due to wire length.

Referring now to FIG. 2G, wire congestion may be considered as a wire costs in the evaluation of the placement and optimization of gates in the physically aware synthesis processes. Logic primitives 264J-264L, also referred to as generic gates herein, are illustrated positioned in a floorplan at X-Y coordinates 265J-265L, respectively. to analyze wire timing delay. The size and/or area of physical gates from the technology library are annotated to the generic gates 264J-264L to better estimate the congestion of wire routes between them. Airline 267K is shown routed between the coordinates 265J-265K of the generic gates 264J-264K. Airline 267L is shown routed between the coordinates 265J and 265L of the generic gates 264J and 264L.

With generic gates, the number of inputs and outputs are known after being translated from the Boolean logic equations. If instead of generic gates, hard macros are placed, the size and number of inputs/outputs are known to route between each. Regardless, it is known that there are N wires routed between generic gates 264J and 264L along the direction of the airline 267L and M wires routed between generic gates 264J and 264K along the direction of the airline 267K. With a plurality of wires routed between a pair of gates, probabilistic routing is used where each wire has an equal opportunity for cross over and conversely an equal probability for pass through. Depending upon how may wires, the length away, and the size/area of the generic gates, a probability of wire congestion and therefore wire cross over can be estimated. The longer the wire with one or just a few wires, the greater the probability of congestion and possibly a wire cross over. On the other hand, the shorter the wire with a larger number of wires routed between the same gates, the greater the congestion and wire cross over. The smaller the size of a generic gate, the greater the probability of wire congestion and wire cross over. The more wires to route between gates, the greater the probability of wire congestion and wire cross over.

In FIG. 2G, the probability of wire congestion is illustrated by a separation of dashed lines between generic gates, assuming that the number of wires M is much less than the number of wires N. For example, consider M=2 and N=256. In this case, even though the size of gates 264J and 264L may be larger, there is a higher probability (closer to a value of 1) of congestion and that there will be wire crossovers. From this probability a number of crossover may be estimated by the product of the number of wires with the probability value. In one embodiment of the invention, congestion is considered as a factor all its own in comparison between choices of implementing a Boolean logic equation with generic gates and their placement in the floorplan. In another embodiment of the invention, wire time delay may be adjusted for congestion.

In FIG. 2H, a cluster 262 of generic logic gates 264E-264I are shown placed together therein with airlines 267F-267I routed between them as shown. In a given cluster, it may be desirable to place/adjust the position of the generic logic gates 264E-264I to minimize wire timing delays to meet timing requirements and minimize wire congestion to achieve a better wire routing during the physical placement and routing process. Thus, the cluster may be analyzed as a whole to minimize a maximum wire length, minimize a number of wire cross overs, minimize a total wire length, and minimize total wire congestion therein. For example, there may be a timing requirement for a signal to go from the gate 264E to the gate 264I. The lengths of wires between the gates 264E-264G and 264G-264I may be summed together to determine a total length L and a total wire delay computed to determine if the timing requirement is met. If not, the placement may be adjusted. The probability of wire congestion may be computed for the placement of gates 264E-264F and the airline 267F with N wires routed to determine if a goal for wire congestion is met. If not, the placement may be adjusted. If there is a goal of zero wire cross overs for a given cluster, the placement of gate 264G may be altered so as to avoid a wire cross over 268I.

Referring now to FIG. 2B, a block diagram illustrates different aspects of Physical Aware Synthesis of an integrated circuit design. Physical Aware Synthesis 100 includes one or more aspects comprising cluster placement 102, physical aware structuring 103, physical aware mapping 104, clock tree planning 105, and guided placement 106. Cluster placement 102, physical aware structuring 103, and physical aware mapping 104 are discussed further herein.

Clock Tree Planning (CTP)

Physical aware clock tree planning 255 deals with the placement of enable gates and clock gates for clock signal paths. Any initial clock tree that is placed without physical considerations is replaced by a clock topology that is planned out with a physical aware clock tree planner and planning process. This application is directed to data signal paths and control signal paths (e.g., multiplexer select signals). Given the complexity of physical aware clock tree planning, it is not disclosed herein.

Cluster Placement

Referring now to FIG. 2C, the placement of the logic primitives into the floorplan of the integrated circuit design is referred to as cluster placement. Aspects of cluster placement 252 include a data flow aware clustering that is RTL driven. The RTL input file having if, then, and else statements to define the IC design is initially translated into logic equations with AND logic expressions and OR logic expressions, such as output O=(A AND B) or (NOT A AND C) for example. The logic equations, having AND logic expressions, OR logic expressions, NOT logic expressions, MUX (multiplexor) logic expression, result in corresponding AND, OR, NOT, or MUX logic primitives that can be represented in a floor plan by generic gates. There may be a plurality of ways to represent a Boolean logic equation with logic expressions. After a translation into logic primitives, an initial physically unaware optimization occurs—such as to eliminate duplicate logic primitives and constants, for example. Subsequently, a physically aware optimization process occurs. Thus, one representation of a logic expression is initially selected such that its generic gates are placed in a cluster together so that it can be evaluated and optimized. That is, to try and optimize the logical function and placement of gates, the generic gates are placed in clusters together in response to the Boolean logic equations.

A cluster 222 of generic gates (GG) 224A-224D, representing the logic primitives, are initially placed into the floorplan 220 of the IC design in order to evaluate the wiring between the generic gates. The generic gates (GG) 224A-224D are independent of the technology library and placed at respective X,Y coordinates 225 in clusters 222 within the floorplan 220. The cluster of generic logic gates attempts to mimic the physical design in the floorplan by predicting physical placement of physical logic gates in a layout of the IC design. With the placement of generic gates in the floorplan, an initial generic wiring (also referred to as airlines—a proxy for physical wiring) between terminals/pins is defined in response to the placement information and the Boolean logic equation for the given cluster.

A physical constraint may constrain where the generic gates may be placed in the floorplan 220 as well as the physical gates in the layout. For example, the generic gates may not be placed in a constrained area 223 for some reason that is defined by the coordinates of the physical constraint.

The placement of the generic gates 224A-224D in the clusters 222 defines generic wires 227A-227C between terminals 226 of two or more generic gates as well as to and from input/output terminals 226. The generic wires may also be independent of the technology library. After the technology independent generic gates are placed within the floorplan, they can be subsequently optimized prior to mapping into the physical gates from the technology library. Given the placement information of the generic gates and the wiring information of the generic wires that may be used to route signals, wiring costs and timing costs can be evaluated. Determinations of how better to implement the logic equations may be made (e.g., optimization), given the estimated placement and wiring information in advance of mapping into physical gates (physical mapping) and placement in a layout (layout placement).

Figure 4A:
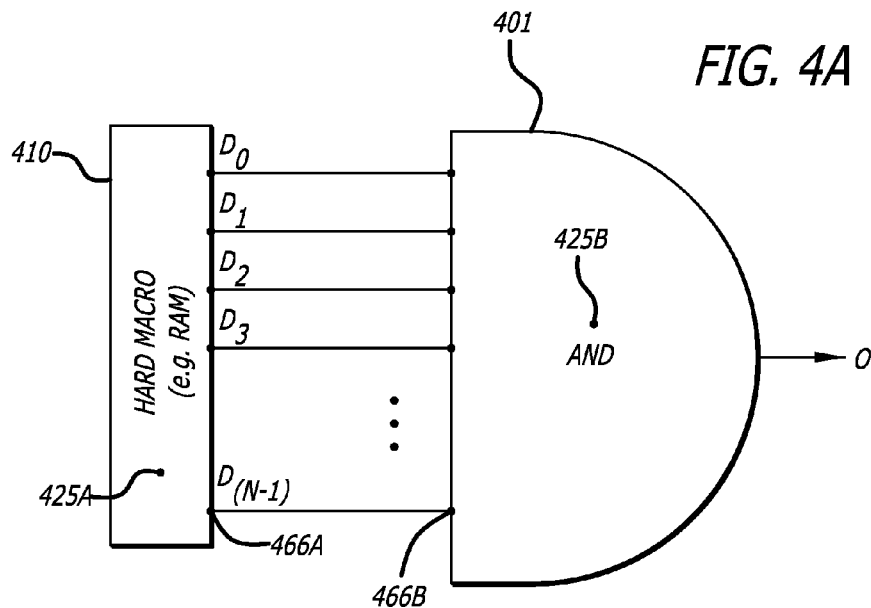
FIGS. 4A-4D are schematic diagrams of circuits to illustrate another aspect of physical aware structuring.

Referring momentarily to FIG. 4A, for example, a hard macro 410, such as a random access memory, and an N input AND gate, where N is large, is illustrated coupled together. An IC design may require that all the data output signal from the hard macro 410 are to be logically ANDed together. Placement and size information 425A for the hard macro 410 and initial placement information 425B for a large input AND gate 401 can be used to determine how best to break up the large input AND gate 401 into something feasible (e.g., two input or four input AND gates available in the technology library) and connect its input terminals 466B to the output terminals 466A of the hard macro 410 with fewer cross overs and perhaps fewer extended wire lengths. With placement information, the pins or terminals 466A-466B of each may be placed closer together and assist into how the large AND gate 401 is formed to reduce gate timing delays as well as wire timing delays.

Referring now to FIG. 2D, the primitives represented by the generic logic gates are optimized prior to physical mapping. The placement 225 of generic gates 224A-224B may be altered, for example, to overcome crossovers that create wiring congestion and added timing delay. After analyzing all the generic gates with the cluster 222, the generic gates 224C-224D may be merged, for example, into a single generic gate 224E placed at its respective coordinates 225 in the floorplan 220. The initial size of the generic gates, how many inputs, for example, may be altered if the initial size is unavailable in the technology library. Each and every logic primitive and generic gate are analyzed for optimization before mapping into the physical logic gates occurs. During the cluster placement and optimization, the logic primitives in the netlist may be annotated with their respective placement information (e.g., coordinates 225). After initial cluster placement and optimizing of the logic primitives, the logic primitives may be mapped into physical logic gates of the layout of the IC design.

Referring now to FIG. 2E, the generic logic gates 224A-224B, 224E representing the logic primitives within each cluster are physically mapped into physical logic gates 234A-234B, 234E (e.g., NAND gates, NOR gates, INVERTER gates) obtained from the technology library associated with the silicon foundry where the IC design is to be manufactured into physical integrated circuit chips. The physical logic gates 234A-234B, 234E may be placed at coordinates 235 within a layout 230 of the IC design. The layout 230 includes a plurality of mask layers that are used to manufacture the physical integrated circuit chip.

After placement, a router or placer/router combo may route the physical wire interconnect 237A-237D between the terminals 236 of the physical logic gates 234A-234B, 234E and the input/output terminals 236. In this manner, the physically aware synthesis is a simple flow from RTL translation into physical gates without having to repeat prior processes.

Physical Aware Structuring

FIGS. 3A-3D, 4A-4D, 5A-5C, 6A-6C, 7A-7D, 8A-8C, and 12A-12B illustrate various aspects of physical aware structuring 253. Aspects of physical aware structuring (PAS) 253 include multiplexer structuring, global tree height minimization (e.g., reduction of serial gate levels within a data path), combinational split, sequential replication, path replication, operational block duplication/sharing, buffering, logic collapse, and logic replication/sharing.

PAS—Multiplexer Splitting

The RTL file of an IC design may define a Boolean equation that defines a large multiplexer with a large number of inputs. However, the technology library of standard cells that is used to implement the IC design may not have a large multiplexer with the large number of inputs.

Figure 3A:
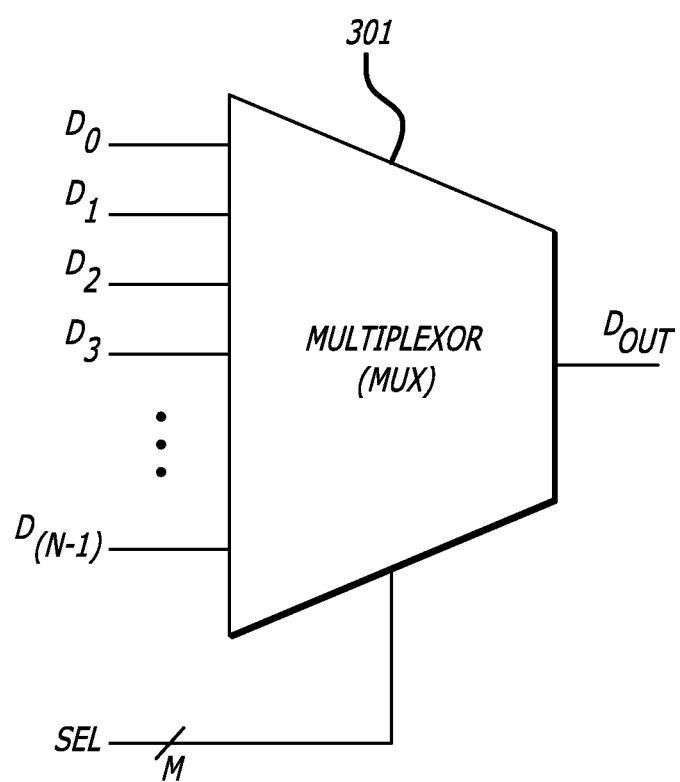
FIG. 3A is a block diagram of an N input multiplexer.

Referring now to FIG. 3A, for example consider the large multiplexer (mux or MUX) 301 with N data input bits and M select input bits. The M select input bits are used to select one of the N data input bits to output on the data output Dout of the multiplexer. If the large multiplexer 301 has a greater number of inputs than that which is available in the technology library, then the large multiplexer needs to be slip into a plurality of smaller multiplexers. For example consider N is 16 and there are 16 data input bits to the large multiplexer 301 with M being 4 select bits.

Figure 3C:
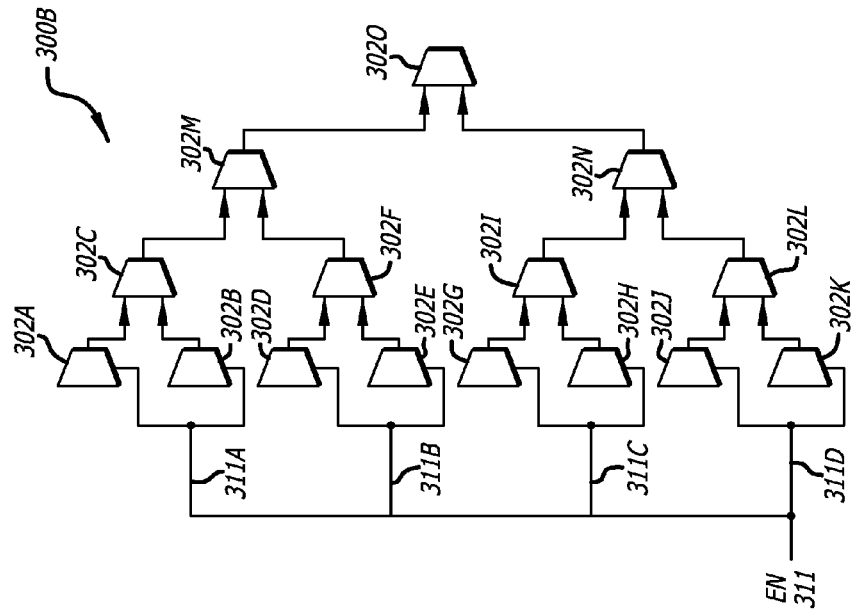
FIG. 3C is a schematic diagram of an optimized multiplexer based circuit with optimized enable wire interconnect.
Figure 3B:
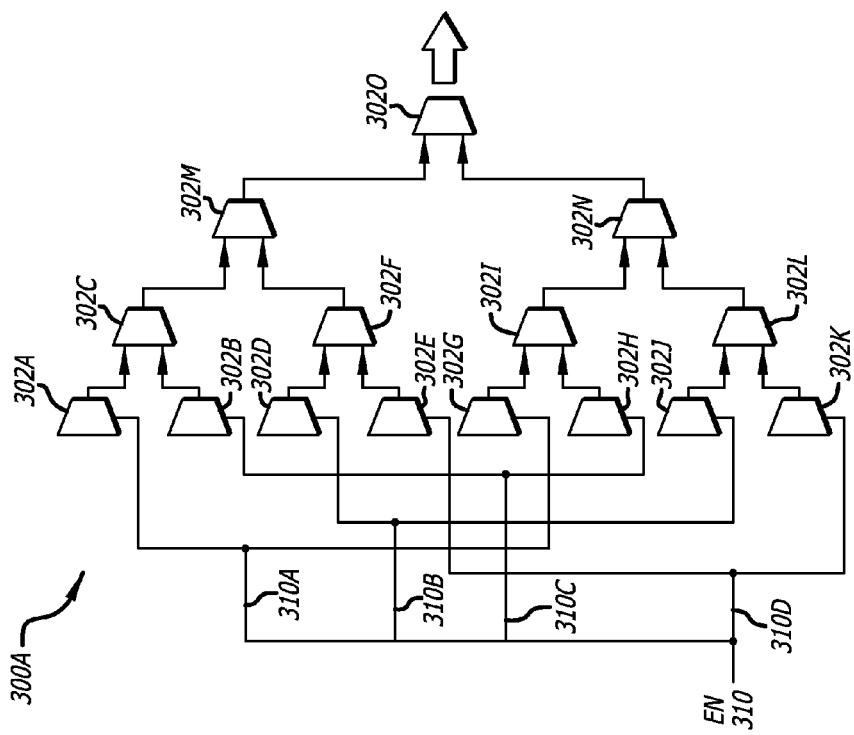
FIG. 3B is a schematic diagram of a multiplexer based circuit with enable wire interconnect in need of optimization.

Referring now to FIGS. 3B-3C, the 16 bit multiplexer is split into fifteen two bit input multiplexers that is available in the technology library that is used to implement the IC. A multiplexer tree of a plurality of multiplexers can be split up into self-contained structures so that multiplexers may be clustered together. FIGS. 3B-3C illustrate MUX structuring where the MUX trees are split into self-contained periodic structures of three two input muxes. For example, multiplexers 302A-302C can be clustered together as one cluster. Multiplexers 302D-302F may be clustered together into another cluster. Multiplexers 302G-302I may be clustered together into another cluster. Multiplexers 302J-302L may be clustered together into another cluster. Multiplexers 302M-302O at a different level of hierarchy may be clustered together into another cluster. Sub clusters may be further clustered together into a hierarchy of multiplexor structures.

Figure 3D:
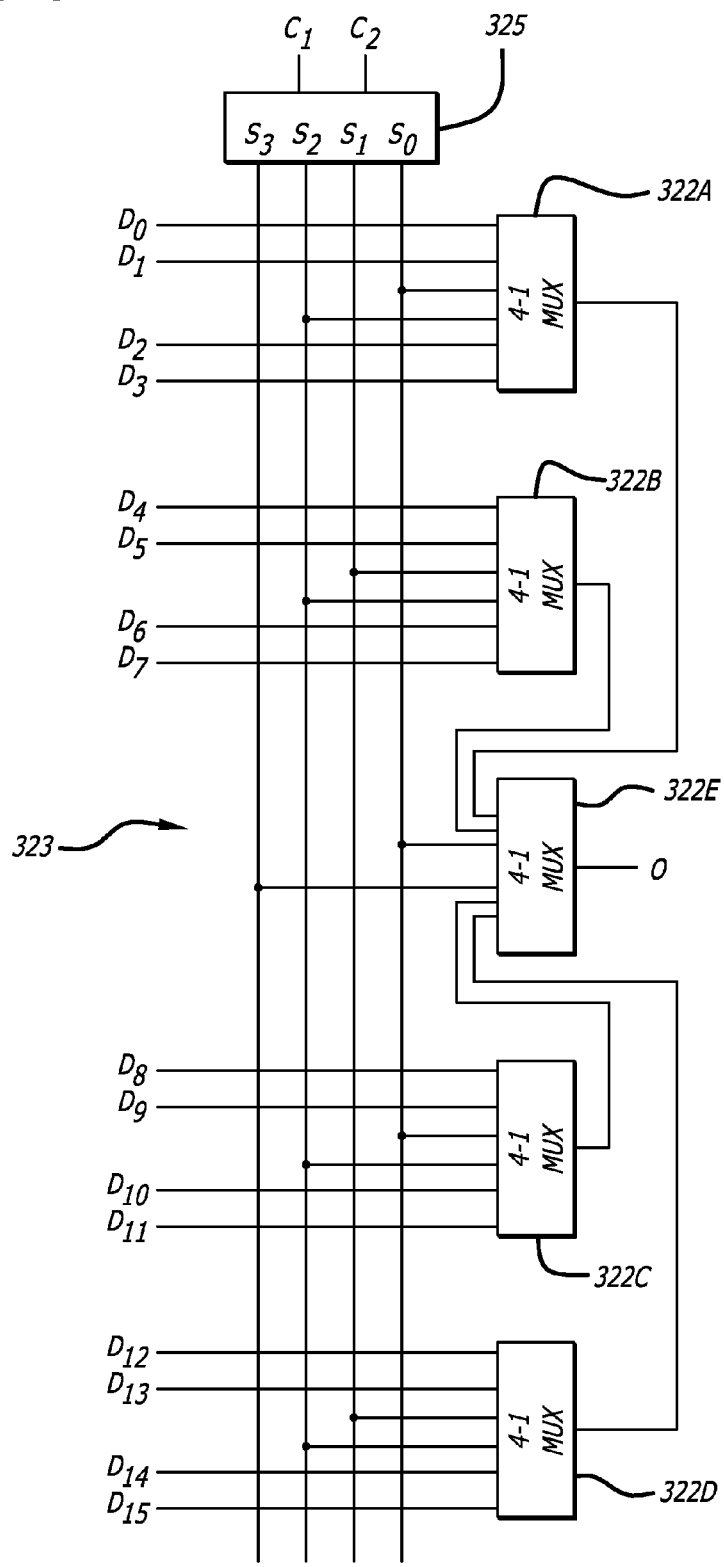
FIG. 3D is a block diagram of control signal wiring for a binary multiplexer based circuit.
Figure 3E:
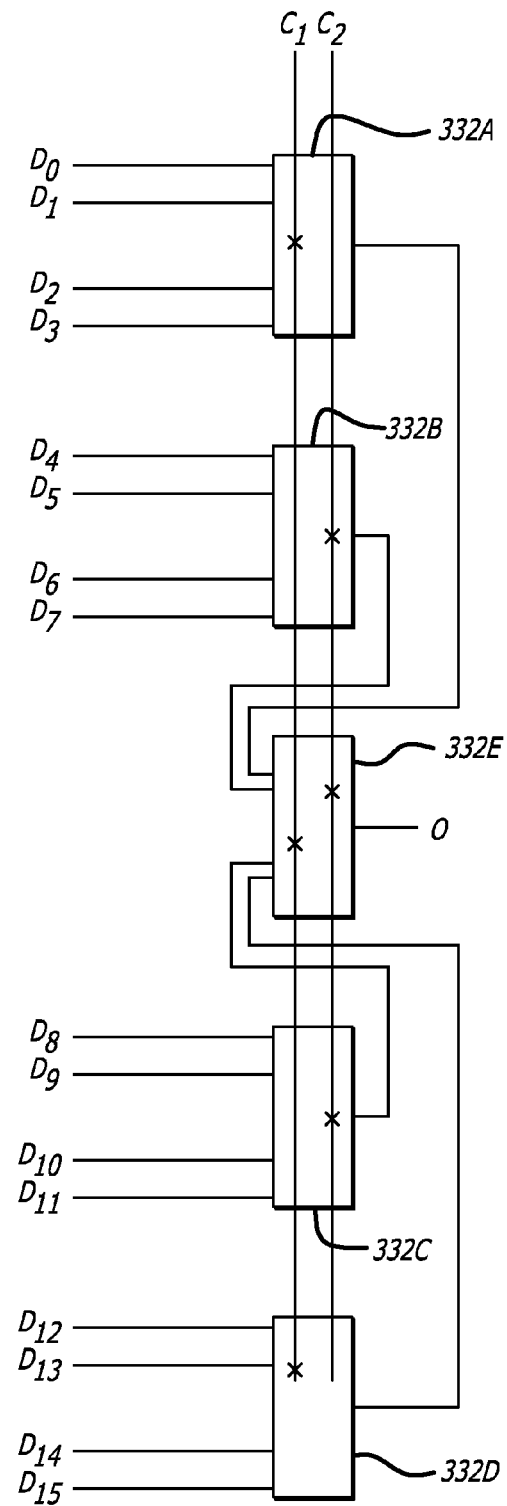
FIG. 3E is a block diagram of control signal wiring for a one hot multiplexer based circuit.

Referring now to FIGS. 3D-3E, each two input multiplexer may be implemented with a different type of two input multiplexer if available in the technology library. For example, a binary mux (e.g., and/or/invert gate mux) or a hot one mux (e.g., transfer gate mux) may be use to implement each smaller input multiplexer. A binary multiplexer design has a more simplified wiring structure but may have greater timing delay from data input to data output and consume more area. A one-hot multiplexer design is often used with a shared control signal generator to generate select signals that can be shared and thus may save logic gates. The one-hot mux cells typically consume less area and may provided better timing delay through their gates from data input to data output. However, the wiring lengths and wire congestion may be increased with numerous wire crossovers adding to timing delays in the receipt of the control signals at the multiplexer.

For example consider the circuit of FIG. 3D. A plurality of 4-1 input muxes 322A-322E are coupled together as shown and implemented using one-hot muxes. The plurality of 4-1 input muxes 322A-322E are coupled to control signal generator 325 by the wire routing or wire interconnect 323. The wire routing or wire interconnect 323 that is shared with the multiplexers has a number of cross overs. Moreover, the signal path length from the generator 325 to the multiplexer 322D is relatively long in comparison with the length from the generator to the multiplexer 322A. Accordingly, the signal timing at the multiplexer 322A may not be optimal.

In FIG. 3E for example, a plurality of 4-1 input muxes 332A-332E are coupled together as shown and implemented using binary muxes. The binary muxes locally generate their own select control signals from the control signals C1 and C2. Accordingly, the total wire route length may be less and the number of wire cross overs may be fewer at the expense of additional gates being placed and consuming layout area. The timing delay of the binary multiplexers may or may not be improved over that of the one hot multiplexers.

During optimization of the Boolean logic equations, the selection of either a one-hot mux or a binary mux as the plurality of smaller muxes is in response to the wire length, wire congestion, and timing delay. If the wire length and wire congestion is more critical than timing delay, then a binary mux may be selected. On the other hand, if the timing delay is more critical than the wire length and wire congestion then the one hot mux may be selected instead.

There is a tradeoff between wiring and speed (signal timing delay) in the selection of the multiplexer structure to implement a multiplexer function. However, with the placement information of the generic gates, an evaluation can be made between each to determine which multiplexer structure is better to use in the implementation of the given multiplexer function. Without placement information, one is left guessing which structure is better given the tradeoffs between wiring and speed (signal timing delay).

For example, assume FIG. 3B is the 16 bit multiplexer split into a circuit 300A of fifteen two bit input multiplexers that are implemented with one-hot muxes. The circuit 300A includes a plurality of multiplexers 302A-302O coupled together as shown. Enable signals 310A, 310B, 310C, and 310D cross over one another before reaching their respective multiplexers enable inputs. The wire length and wire congestion is typically greater with a one hot mux implementation. The multiplexers to which the enable signals are coupled are spread out far apart to different clusters of multiplexers. If the wire length and wire congestion are more critical than timing delay, then a binary mux is selected.

For example, in FIG. 3C, the 16 bit multiplexer is split into a circuit 300B of fifteen two bit input multiplexers that are implemented with binary muxes. The circuit 300B includes a plurality of multiplexers 302A-302O coupled together as shown. To shorten the wire length and reduce the parasitics and timing of the enable signal to the multiplexers, the signal may be coupled into adjacent multiplexers instead. The wire length and wire congestion of enable signals 310A, 310B, 310C, and 310D are less. Enable signal 310C is coupled into the enable input of multiplexer 302H and 302B. Enable signal 311C is coupled into the enable inputs of adjacent multiplexers 302G and 302H. Enable signal 311A is coupled into multiplexers 302A-302B. Enable signal 311B is coupled into multiplexers 302D and 302E. Enable signal 311G is coupled into the enable inputs of multiplexers 302J-302K. In this manner, the enable signals are shorter and avoids crossing over adjacent enable signals.

PAS—Global Tree Height Minimization

FIGS. 4A-4D illustrate the global tree height minimization (THM) aspect of physical aware structuring. The RTL file of an IC design may define a Boolean equation that defines a large combinational logic gate such as an AND, OR, NAND, NOR, XOR, or XNOR gate with a large number of inputs. However, the technology library of standard cells that is used to implement the IC design may not have such a combination logic gate with a large number of inputs. The large combinational logic gate must be broken down into smaller input combinational logic gates. However, with smaller input combinational logic gates, a tree of combinational logic gates is formed from input to output Reference is now made to FIG. 4A. In FIG. 4A, a circuit comprises an N input AND gate 401 coupled to a hard macro 410. The N AND gate 401 has N data inputs from $D_0$ to $D_{(N-1)}$ that are ANDed together to determine the logical value of output O. The number of inputs N into the AND gate 401 may be very large, such as 256 for example. Assuming a 256 input AND gate is available to place adjacent the hard macro 410, the wire routing between terminals/pins of each may be too congested and too long. In which case, it may be desirable to break up the size of the AND gate 401 to gain flexibility in placing smaller AND gates adjacent the hard macro 410 to shorten wire lengths and reduce the number of wire crossovers. Moreover, the technology library may not have an AND gate with the larger number of N inputs. Thus, the AND function must be made up from other AND gates that are available in the technology library.

During optimization of the Boolean logic equations, a determination is made if there is a large AND gate, NAND gate, OR gate, NOR gate, XOR gate, or XNOR gate having a number of inputs greater than that which is available in the technology library. If so, the large gate is split into a plurality of smaller gates that are available in the technology library. Minimizing a wire cost (wire crossovers and wire length) is desirable in the selection of the smaller AND gates used to implement the N input AND gate.

Figure 4B:
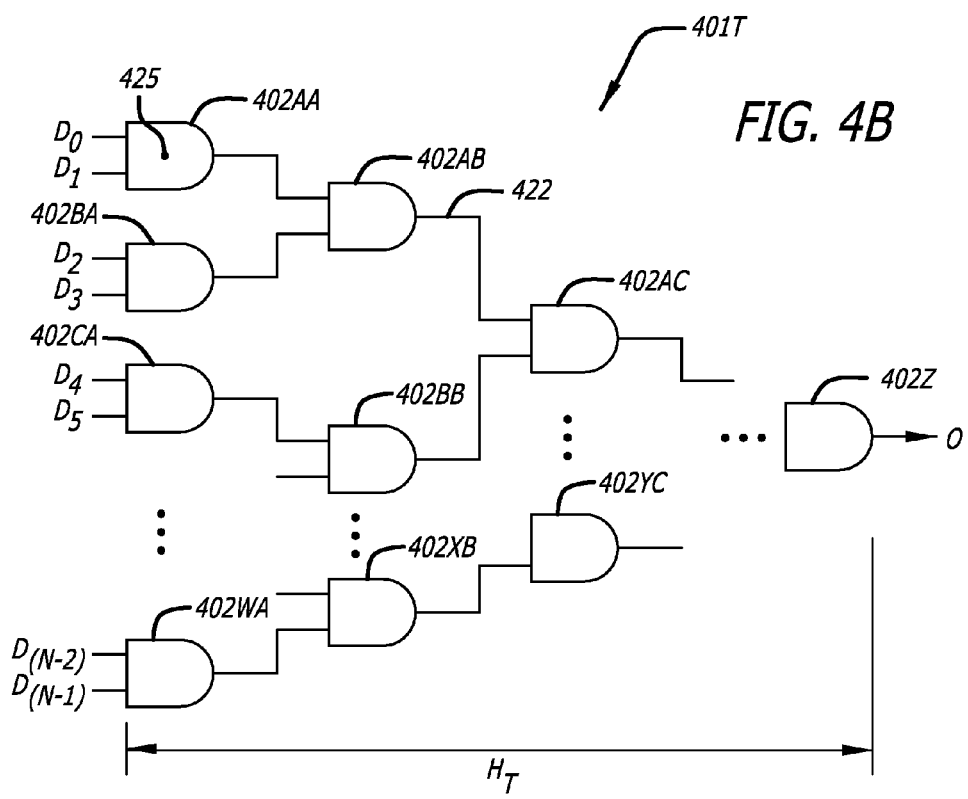

Reference is now made to FIG. 4B, illustrating two input AND gates 402AA through 402Z having a tree height of Ht levels of AND gates to form the N input AND gate 401. Depending upon the type of AND gates available in the technology library (e.g., 2 input, three input, four input, . . . 10 input, etc.), the tree height can be adjusted thereby changing the timing delay (arrival time) of the output signal. However, a smaller tree height of Ht levels of AND gates may result in some wire cross over. Placement information 425 for each of the two input AND gates 402AA through 402Z can assist in evaluating how best to synthesize and form the N input AND gate 401 out of the smaller input AND gates that are available in a technology library. It is desirable to minimize the tree height of the Ht levels of AND gates in formation of the N input AND gate 401 to reduce timing delay. Additionally, it is desirable to globally minimize or balance cross overs and wire lengths within the wire interconnect 422 between the AND gates to achieve a balance in the arrival time (timing delay) of signals through the tree of AND gates 401T. To achieve these goals, it is desirable to view the optimization from a high level or global perspective to see how best to optimize (minimize) the tree height Ht. Optimizing only a few gates at a time, such as AND gates 402AA,402BA, 402AB, can miss out on a better overall optimization of the formation of the AND gate 401 as well as create unbalanced signal arrival times through the tree 401T. With estimates of placement information provided by cluster placement of generic logic gates, the tradeoffs between timing delay and wire congestion can be considered together to determine a better synthesis of a large N input combinational logic gate.

Now consider for example an odd numbered input AND gate such as a three input AND gate. Two input and four input AND gates may be available in the technology library but perhaps not a three input AND gate. A three input AND gate may be formed out of 2 two input AND gates. Each circuit 400A-400B illustrated in FIGS. 4B-4C provides a 3 input AND function.

Figure 4D:
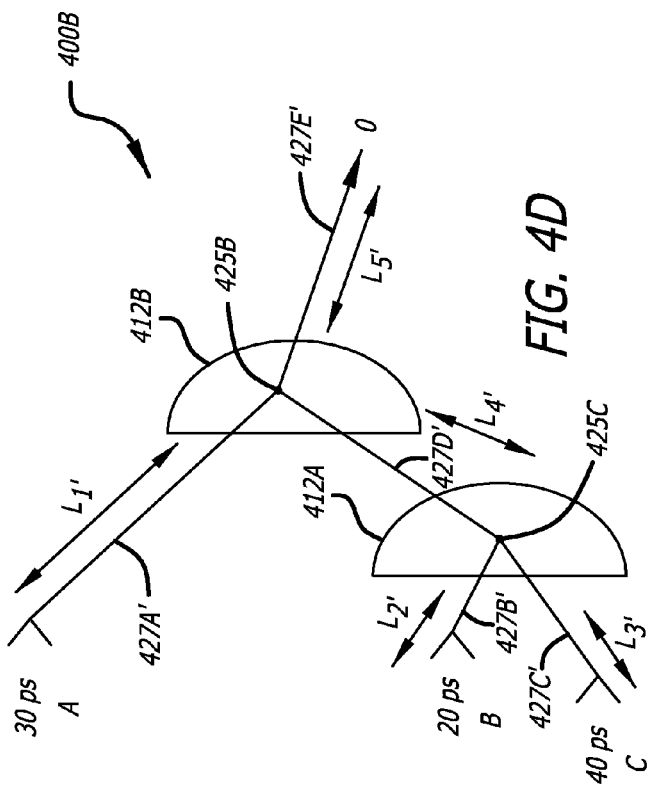
Figure 4C:
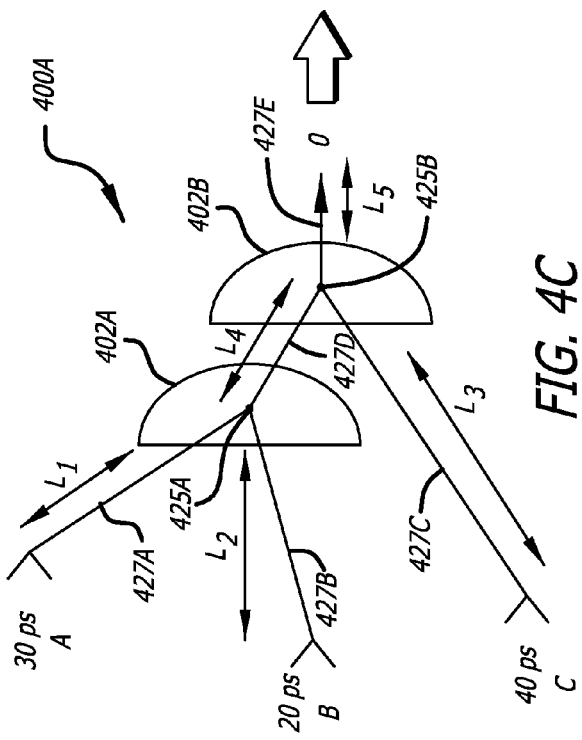

Referring now to FIG. 4C, a circuit 400A is illustrated including a first two input AND gate 402A and a second two input AND gate 402B coupled together as shown. The first AND gate 402A has two inputs respectively coupled to the terminals of input signal A and input signal B. The second AND gate 402B has two inputs respectively coupled to the output of AND gate 402A and the terminal of input signal C to generate the output O. The airlines 427A-427E are shown between gate placement coordinates 425A-425B and input pins/terminals and output pins/terminals.

The functionality of the first two input AND gate 402A and the second two input AND gate 402B coupled together is that of a three input AND gate. In this manner, a large Boolean logic gate is split up into a plurality of smaller Boolean logic gates. However, the timing of the AND gates 402A-402B in the circuit 400A may not be optimal or a wire length from an input terminal to an input of either AND gate may be extraordinarily long. Alternatively wire interconnects may have to cross, adding additional parasitic resistance and capacitance to a signal line and thereby increase signal timing delay.

In any case, timing may be of consideration in the circuit 400A generated after the split up of the larger Boolean logic gate due to unbalanced timing. For example, consider the arrival time of the signal A at input terminal A is 30 picoseconds (ps), the arrival time of the signal B at input terminal B is 20 picoseconds, and the arrival time C at input terminal C is 40 picoseconds. The wire lengths from the input terminals to the inputs of the AND gates 402A-402B may be long and add to the timing delay. Consider that the length L2 of the airline 427B is long having a wire delay timing of 60 picoseconds while the lengths L1,L3-L5 of airlines 427A,427C-427E cause a wire timing delay of 10 picoseconds each. The total arrival timing of the input signals A,B,C into the AND gates 402A-402B is respectively 40 ps, 80 ps, and 50 ps. Thus, even though the arrival time at input terminal B is less than the arrival time at input terminal C, the wire time delay can cause the input signal to be further delayed before reaching a gate, such that the signal C from input terminal C arrives earlier than the signal B from input terminal B for example. Thus, it may be desirable to merge AND gates differently in order to reduce the wire time delay on the input signals and balance the delays through a tree of logic gates. Accordingly, the tree shape of the AND gates 402A-402B may be rebalanced. Thus, the optimizing of the Boolean logic equations includes rebalancing the tree shape of the plurality of smaller gates including the wire lengths and their respective gate delays to primarily minimize timing delay in gates and secondarily minimize wire lengths and cross overs and their respective added timing delays.

Referring now to FIG. 4D, a circuit 400B is illustrated having the same logic function of circuit 400A. However, through rebalancing of the logic gates, the timing of circuit 400B is improved over that of circuit 400A with the same given input arrival times at input terminals A, B, and C. Circuit 400B has a first AND gate 412A and a second AND gate 412B coupled together as shown. The first AND gate is coupled to the terminals of and respectively receives input signals B and C. The second AND gate 412B is coupled to the output of the first AND gate 412A and the terminal of input signal A to generate the output O. With the AND gate 412 position closer to the terminals of the input signals B and C, the lengths of the airlines 427B,427C' are reduced to L2' and L3' and the associated wire time delay is reduced, such as to 10 ps and 5 ps, respectively. The lengths L1', L4',L5' of airlines 427A',427D',427E' may slightly increase over that of lengths L1', L4',L5' of airlines 427A',427D',427E' as a result. Assume each increases to 15 ps, for example. However, provided the serial wire time delay in a critical path, such as from input B to output O, is less in circuit 400B than that of circuit 400A, circuit 400B may be the preferred choice. For example, in circuit 400A the serial wire delay timing from input B to output O is 70 ps while in circuit 400B the serial wire delay timing from input B to output O is 40 ps and would be the preferred choice.

In this manner, input signal arrival times and wire time delays are balanced through to the generation of the output signal O. The critical paths in each circuit of equivalent function is compared and the one with the quickest arrival time at the output O may be selected as the optimized circuit.

PAS—Combinational Split/Merge

Referring now to FIGS. 5A-5C, a combinational split, another aspect of physical aware structuring is described. The opposite of a combinational split is a combinational merge, where a duplicate logic gate is merged together as one. In a tree of combinational logic, performing combinational merges and splits without placement and wire information can be disadvantageous because of wire congestion. Improperly splitting or merging combinational logic gates can result in wire cross overs and increased time delay instead of an expected decrease in time delay. Furthermore, peep hole logic optimization may see logic gates as being fixed and improperly determine that a merge is not feasible with a following logic optimization.

In the case of a combinational split, the fan-out load on the outputs of logic gates is considered during logic synthesis. During optimization of the Boolean logic equations, a determination is made if the fan-out on the output of the logic gates exceeds a predetermined fan-out number. If so, the placement information of the fan-out load and the driving gate is analyzed to determine how it can be split up. The driving logic gate is duplicated with inputs coupled in parallel but with separate outputs to drive the split up fan-out load. The split up of the fan-out may be determined to reduce timing delay and to minimize wire congestion. After determining how the fan-out load is to be split up, the logic primitive is duplicated and placed in the floorplan in order to have different outputs drive the split fan-out. The splitting of the fan-out load is based on the location (placement) of the fan-out load with respect to the driving gate and the goal of reducing timing delays and avoiding wire congestion in the resulting plurality of output signals. The inputs of the duplicated logic primitives are all coupled to the same inputs signals and generate the same logical output signals but from different output terminals.

In FIG. 5A, a single AND gate 501 has inputs A 510A and B 511A and an output O. The output O of AND gate 501 has a rather large fan out to different logic gates in the next circuit. Output O may be coupled to a total fan out 520. Assume for example, the output O of the AND gate 501 drives seven different logic gates. The total fan out 520 may be too much for the gate 501 to drive in a timely manner, causing added time delay. The fan out 520 may have numerous cross overs and extended wire lengths to reach the next gate. The timing of the output signal from the gate can be improved by splitting up the total fan out 520 and cloning the combinational logic gate to separately drive the split up fan-out.

As shown in FIG. 5B for example, the total fan out 520 may be numerically split up by N (e.g., N=3) into the smaller portions (e.g., thirds) comprising fan out 520A, fan out 520B, and fan out 520C. The splitting of the fan-out may be equally spread over M logic gates. Alternatively, a determination may be made based on wire congestion and wire lengths on how to split up the fan-out amongst duplicated logic gates.

Referring now to FIG. 5C, circuit 500C is illustrated having AND gates 501A-501C with each having respective inputs coupled in parallel to input signals 511A-511B as shown. Each of AND gates 501A-501C has two inputs, one which is coupled to input signal A 511A and the other input being coupled to input signal B 511B. Each of AND gates 501A-501C has a reduced amount of fan out to drive over that of AND gate 501. For example, as illustrated in FIG. 5B, AND gate 501A has a fan out 520A of two, AND gate 501B has a fan out of two, and AND gate 501C has a fan out 520C of three.

PAS—Physical Sequential Replication

Figure 6A:
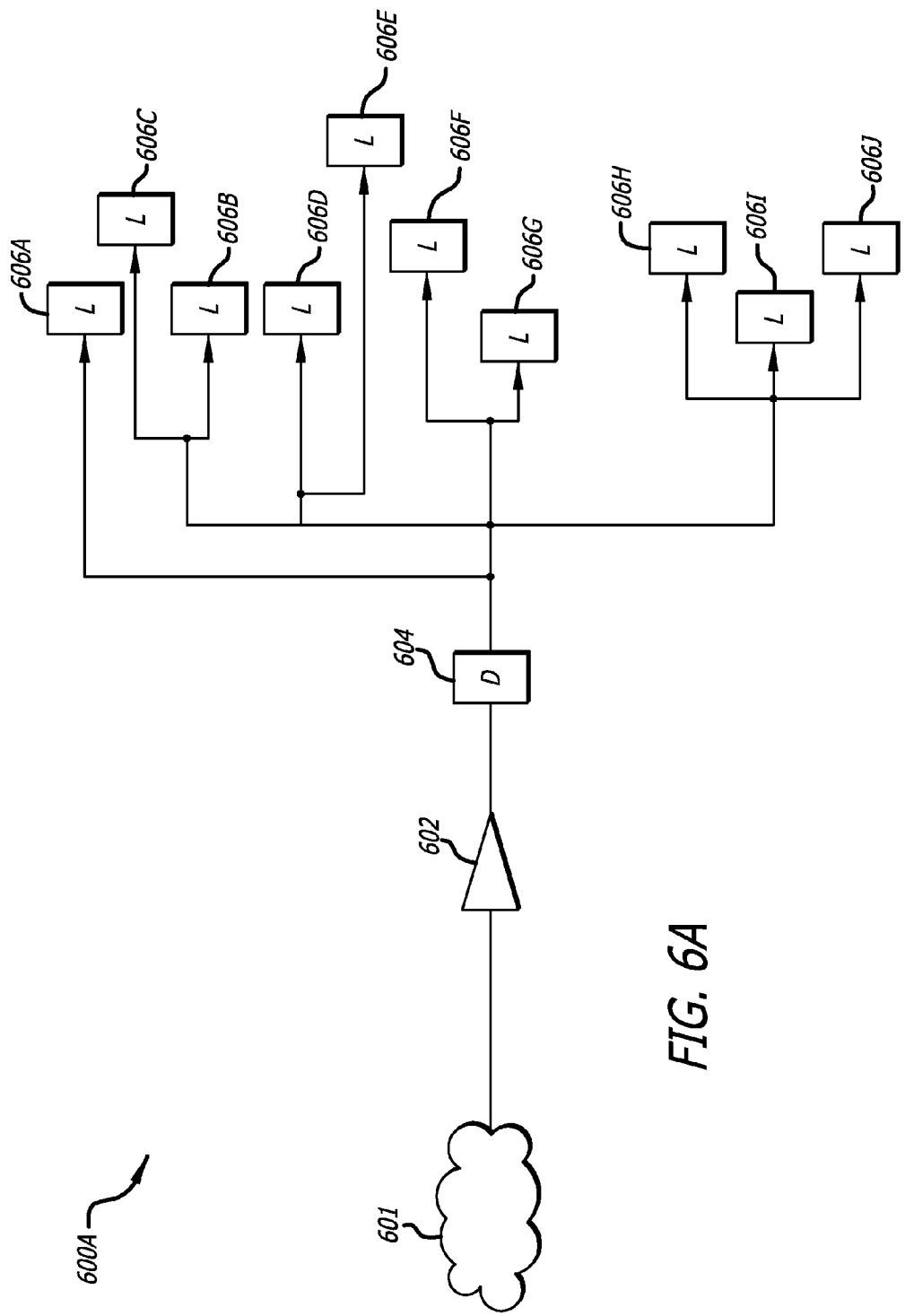
FIGS. 6A-6C are schematic diagrams of circuits to illustrate another aspect of physical aware structuring.
Figure 6B:
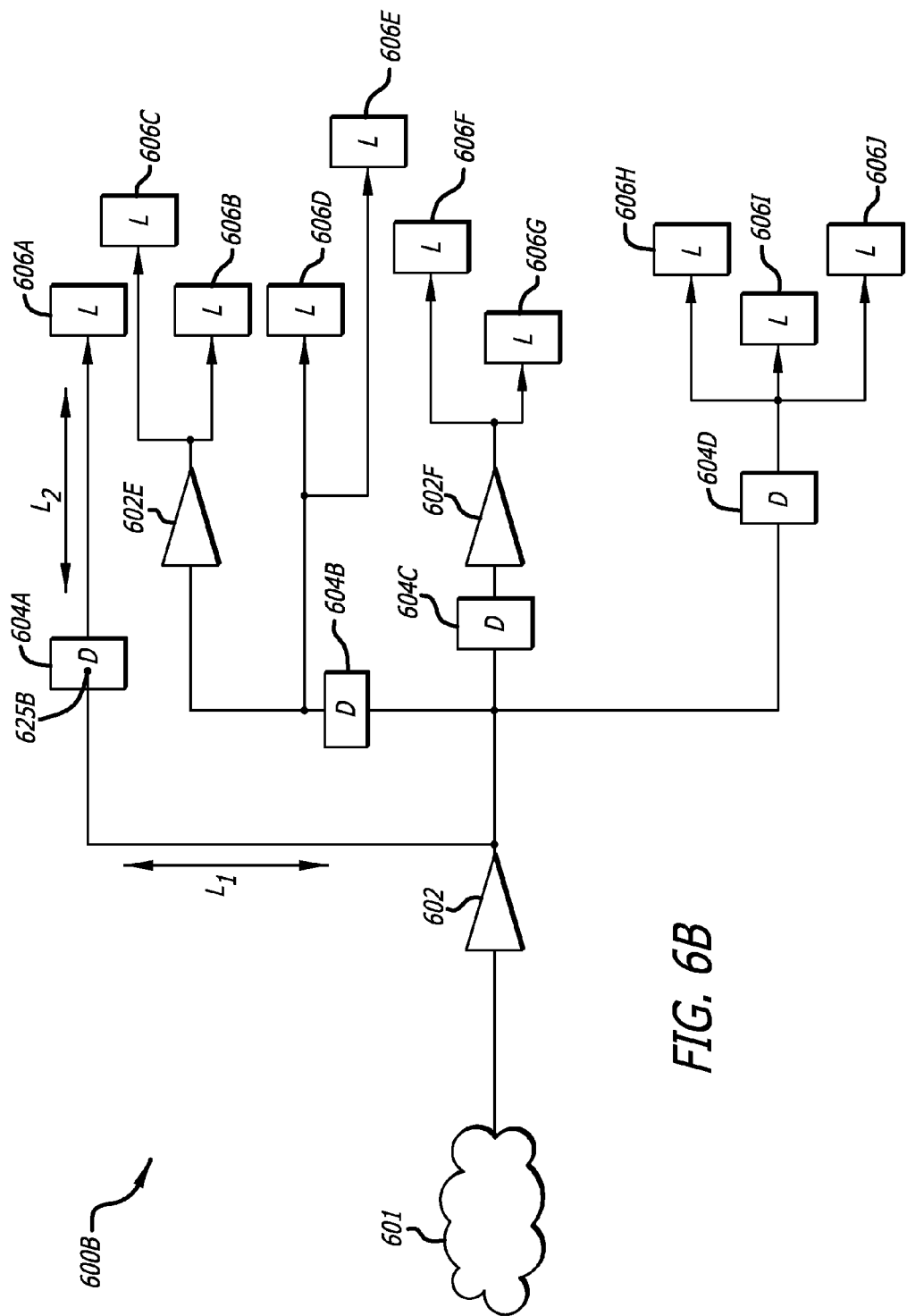
Figure 6C:
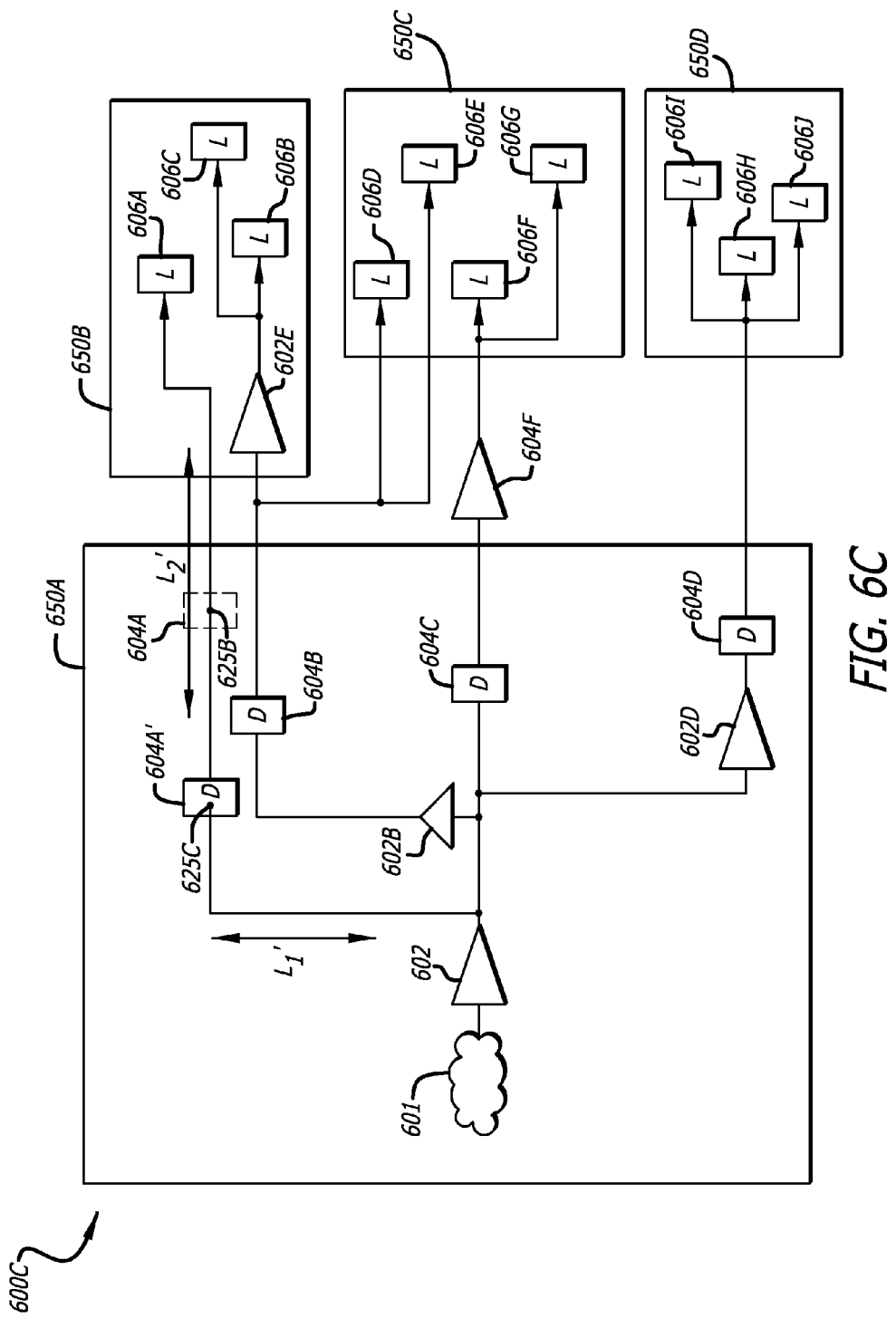

Referring now to FIGS. 6A-6C, physical sequential replication is now explained. Physical sequential replication is similar in concept to combinational logic splitting described herein but for the fact that a sequential clocked element, such as a latch, a flip-flop, or a register, are being duplicated and its load being split up amongst the outputs of the duplicated sequential clocked element.

In FIG. 6A, a circuit 600A is illustrated including a buffer 602, a D flip flop 604 (the sequential element in this case), and circuit loads 606A-606J coupled together as shown. The circuit loads 606A-606J may be any type of logic gate coupled to the Q output of the D flip flop 604. The D flip-flop 604 is clocked by some clock signal CLK to periodically store data at the D input to the D flip flop. The input of buffer 620 is coupled to another logic circuit 601 to receive data that is to be stored by the D flip-flop 604.

During the optimizing of the Boolean logic equations an analysis may be made to determine if a flip flop has a fan-out exceeding a predetermined fan-out number. If the fan-out load on the output of a flip flop exceeds the predetermined fan-out number, the fan-out load in the circuit is analyzed to determine how to split it up or divide into reduced fan-out load portions. The split up of the fan-out may be analyzed to determine how to reduce wire crossovers and minimize wire congestion as well as to improve timing. After determining how to split up the fan-out on the flip-flop, the flip flop is duplicated with input terminals coupled in parallel to the same inputs (or at least coupled to receive the same logic signal input) but with different output terminals driving the split fan-out. The logical signal that is output from the flip flops is the same but electrically different by driving the respectively split fan-out.

Referring now to FIG. 6B, a circuit 600B is illustrated. The D-flip flop 604 of FIG. 6A has been respectively replicated into D flip flops 604A-604D. Furthermore, the circuit loads 606A-606J have been split up and coupled to the respective outputs of the D flip flops 604A-604D as shown. If it is determined that buffering is desirable to further improve timing delay, buffers may be added between the output of a D flip flop and a circuit load, such as buffers 602E-602F added between flip-flops 604B-604C and loads 606C,606B,606F, 606G as illustrated.

The circuit load 606A is directly coupled to the output of the D flip-flop 604A. The circuit load 606D-606E is directly coupled to the output of the D flip-flop 604B while the circuit load 606D-606E is buffered from the output of the D flip-flop 604B by the buffer 602E. The circuit load 606F-606G is buffered from the output of the D flip-flop 604C by the buffer 602F. The circuit load 606H-606J is directly coupled to the output of the D flip-flop 604D.

Portions of the circuit 600B may be clustered together into four clusters 650A-650D as shown by circuit 600C in FIG. 6C. The cluster 650A includes the sequential elements of the D flip flops 604A-604D. The clock signals may be routed to the clock inputs of the D flip flops in a balanced manner within the cluster. Circuit loads 606A-606C and buffer 602E may be grouped together into a cluster 650B. Circuit loads 606D-606G may be grouped together into a cluster 650C and driven by buffer 602F. Circuit loads 606H-606J may be grouped together into a cluster 650D and driven by the D flip flop 604D.

Furthermore, the replicated D flip-flops may place too much load onto the output of buffer 602 in which case an additional buffer may be inserted there between, such as buffers 602B,602D between buffer 602 and flip-flops 604B, 604D as illustrated in FIG. 6C.

In FIG. 6B, the D flip flop 604A is placed in the floorplan at coordinates 625B such that there is a wire length L1 in the airline between the buffer 602 and flip-flop 604A and a wire length L2 in the airline between the flip-flop 604A and circuit load 606A. The wire lengths L1 and L2 have an associated wire time delay for each. It may be desirable to move the D flip flop 604A to a different position and coordinates in the floorplan so as to balance the wire time delays between opposite sides of the flip flop. For example, it may be desirable to reduce the length L1 and decrease associated wire timing delay at the input side of the D flip flop while length L2 and its associated wire timing delay is increased on the output side to balance timing around the D flip flop. This wire timing delay balancing may be desirable for example, if the input side has a heavier load than that of the output side.

In FIG. 6C, for example, D flip flop 604A at coordinate 625B is moved to coordinate 625C as indicated by D flip flop 604A' such the wire length L1 is reduced to L1' in the airline between the buffer 602 and flip-flop 604A to reduce timing delay into the D flip flop and receive a signal sooner. However, the wire length L2 is increased to L2' in the airline between the flip-flop 604A and the circuit load 606A. The amount of increase in wire length from L2 to L2' is equal to the reduction in wire length from L1 to L1' so that timing can be balanced between input and outputs around a D flip flop. Accordingly the timing delay in the output signal from the flip-flop 604A is increased by the amount of timing delay reduction into the flip flop 604A.

PAS—Logic Collapsing

Referring now to FIGS. 7A-7D, logic collapsing, another aspect of physical aware structuring is described. The optimizing of the Boolean logic equations includes determining if a plurality of the same type of Boolean logic gates (e.g., AND, OR, XOR, NAND, NOR, XNOR) are collapsible logic gates that can be collapsed into a single logic gate. Two logic gates are collapsible logic gates if they are the same type of Boolean logic gate and if they are coupled together, such as with an output coupled to an input. If a plurality of the same type of Boolean logic gates can be collapsed into a single logic gate, then two or more collapsible logic gates can be selected and collapsed into a single logic gate of the same type. The selection is made in response to the wire lengths to primarily minimize timing delay (including wire timing delay) and secondarily to minimize wire lengths and wire cross overs. Wire length and the number of wire cross overs can be considered wire costs. A synthesis solution is selected by minimizing both timing delay and wire costs.

Figure 7B:
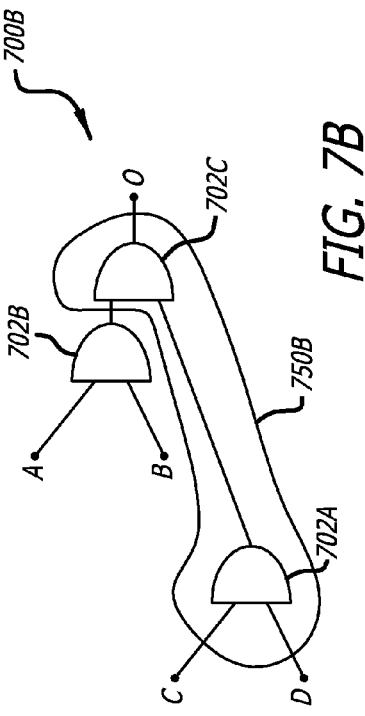
FIGS. 7A-7D are schematic diagrams of circuits to illustrate another aspect of physical aware structuring.
Figure 7A:
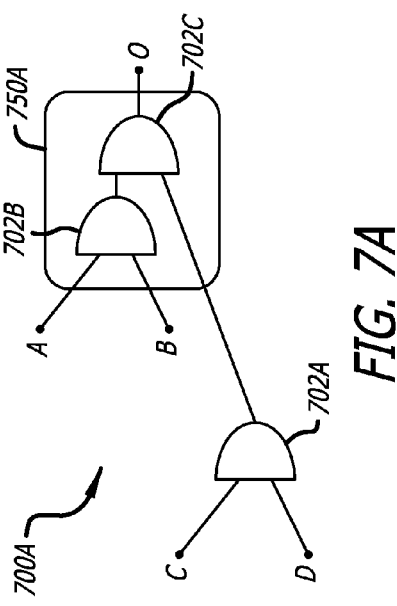
Figure 7D:
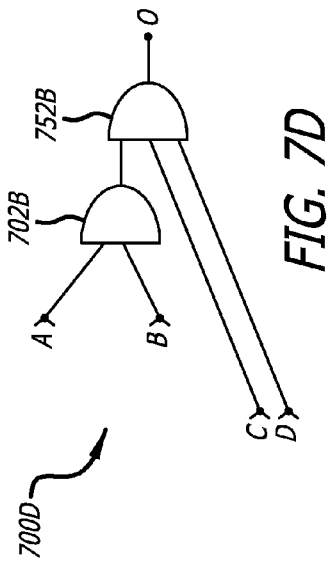
Figure 7C:
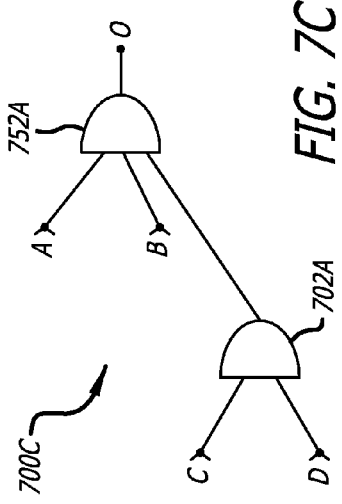

Referring now to FIGS. 7A and 7C for example, circuit 700A includes two input AND gates 702A-702C coupled together as shown. In the circuit 700A, the two input AND gates 702B and 702C are grouped together in the cluster 750A and selected for collapse. The two input AND gates 702B and 702C may be collapsed together into a single three input AND gate 752A as illustrated by the circuit 700C in FIG. 7C. In this case, the wire length between AND gates 702A and 702C caused less delay in comparison with the gate delays through AND gates 702B-702C.

Referring now to FIGS. 7B and 7D for example, circuit 700B also includes two input AND gates 702A-702C coupled together as shown. However, in the circuit 700B, the two AND gates 702A and 702C are grouped together into a cluster 750B and selected for collapse. The two input AND gates 702A and 702C may be collapsed together into a single three input AND gate 752B as illustrated by the circuit 700D in FIG. 7D. In this case, the wire length between AND gates 702A and 702C causes more delay than the gate delay through the AND gates 702B-702C.

PAS—Logic Sharing

Referring now to FIGS. 8A-8C, the concept of logic sharing is now described. The optimizing of the Boolean logic equations includes determining if an output of a logic equation can be shared with other logic primitives in a plurality of different ways to share. If an output can be shared, then the logic primitive to which the output is shared is selected based on having a shorter wire length in order to minimize timing delay and cross overs. Wire length and the number of cross overs can be considered wire costs. A synthesis solution is selected by minimizing both timing delay and wire costs.

In FIG. 8A for example, circuit 800A includes two input AND gates 802A, 802D, 802E and three input AND gates 802B-802C. Logic inputs A, B, C, D generate logic outputs O1, O2, and O3 respectively from AND gates 802C,802E, 802B. Output O1 is the function of ANDing together input signals A, C, and D by the equation O1=ACD. Output O2 is the function of ANDing together input signals A, B, C, and D by the equation O2=ABCD. Output O3 is the function of ANDing together input signals A, B, and D by the equation O3=ABD.

With input A coupled into AND gates 802A and 802C, inputs C and D coupled into both AND gates 802C AND 802D, and the output of AND gate 802D coupled into AND gate 802E, logic sharing may be used to reduce the number of gates. Reducing the number of gates by logic sharing also reduces the number of wires and the wire length. In this case, the output of AND gate 802C may be shared and coupled into AND gate 802E; and the input signal B can be shared and coupled into both AND gate 802E and AND gate 802B as shown in FIG. 8B, while considering the logical functionality at the outputs O1,O2, and O3.

In FIG. 8B, logic sharing eliminates AND gate 802A and AND gate 802D in the circuit 800B to generate the same output signals 01, 02, 03. However, a long wire route 810 has been formed from the input signal B to the input of AND gate 802E. This may cause a timing issue in the generation of the output signal O2. The Boolean logic equations generated by the outputs O1,O2, and O3 remains the same.

Further logic sharing may be able to avoid a long wire route and coupling input signal B into AND gate 802E. Output O2 is the function of ANDing together input signals A, B, C, and D by the equation O2=ABCD. Input signal B is coupled into AND gate 802B. Instead of using output O1 as an input to AND gate 802E, the output O3 may be used for logic sharing and coupled as an input to AND gate 802E. With output O3 ANDing together A, B, and D; input signal C is needed as the second input to AND gate 802E to conserve logical functionality. The Boolean logic equations generated by the outputs O1,O2, and O3 remains the same.

Referring now to FIG. 8C, circuit 800C is illustrated with the same three input AND gates 802B-802C and the same two input AND gate 802E as shown in FIG. 8B. However, the logic gates in circuit 800C are coupled together differently than in FIG. 8B. Output signal O3 from AND gate 802 is coupled into an input of AND gate 802E; and input signal C is coupled into the second input to AND gate 802E to generate the output 02. The Boolean logic equations generated by the outputs O1,O2, and O3 remain the same. In this manner, the delay due to the extended wire 810 may be eliminated.

PAS—Operational Block Duplication/Sharing

Figure 12B:
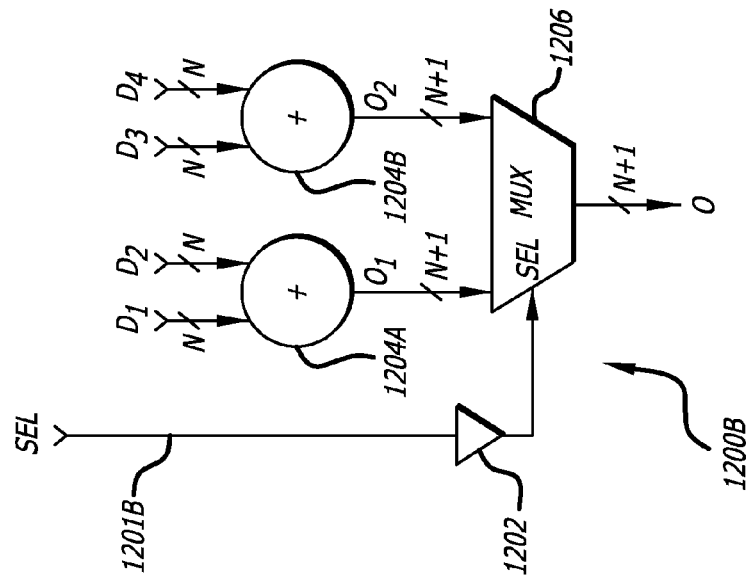
FIGS. 12A-12B are schematic diagrams of circuits to illustrate another aspect of physical aware structuring.
Figure 12A:
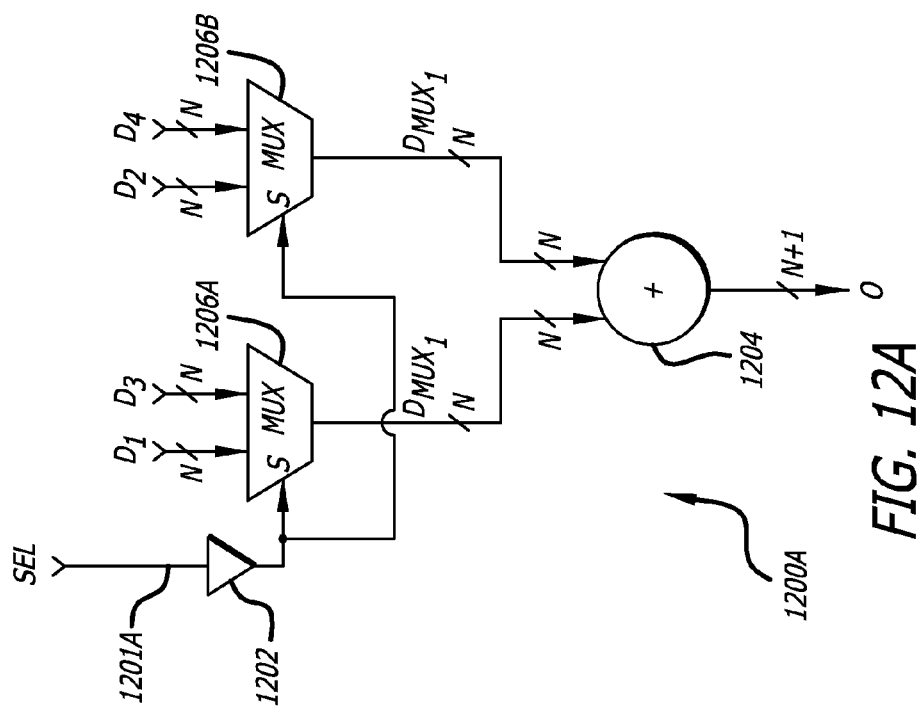

Referring now to FIGS. 12A-12B, the concept of operational block duplication/sharing is now described. The optimizing of the Boolean logic equations includes determining if a control signal, such as the select signal, that is coupled into a control input of a bus multiplexer in a cluster of a plurality of logic operators has a late arrival time or a large time delay. The logic operators may be any operational block such as an adder, a subtracter, a multiplier, a divider, or a squarer functional block operating on one or more buses of parallel data bits. If the control signal has a late arrival time, such as may be from a lengthy wire, the optimization of such cluster avoids sharing of the operational block. The optimization of such a cluster may duplicate the operational block (the logic operator), and move the original and duplicated operational block from an output side of the bus multiplexer to an input side of the bus multiplexer.

In FIG. 12A, a circuit 1200A is shown with an operational block 1204 coupled to a pair of bus multiplexers 1206A-1206B. The operational block 1204 is shared amongst four data buses D1-D4 by the pair of bus multiplexers 1206A-1206B. A select signal SEL is buffered by the buffer 102 and coupled into the select inputs of the pair of bus multiplexers 1206A-1206B. The circuit 1200A may be efficient in area usage due to the sharing of the operation block 1204. However, if the select signal has an unexpected late arrival time, the output results from the operational block 1204 may not have sufficient time to be properly evaluated. If the select signal has a late arrival time at the select input of the multiplexer, it is desirable to avoid an optimization of a cluster of circuits that shares the operational block. It is desirable to duplicate the operational block 1204 and move it and the duplicate from the output side of the multiplexers 1206A-1206B to the inputs on an input side of a single bus multiplexer that multiplexes the outputs from the original and duplicated operational blocks.

Referring now to FIG. 12B, a circuit 1200B is shown with a pair of operational blocks 1204A-1204B (the original and duplicated) with respective outputs O1-O2 coupled into the inputs of a multiplexer 1206. The operational blocks 1204A-1204B are placed on the input side of the multiplexer 1206. The operational blocks 1204A-1204B are not shared amongst the four data buses D1-D4. Operational block 1204A performs its logical function on data buses D1 and D2. Operational block 1204A performs its logical function on data buses D3 and D4. In this manner, the operational blocks 1204A-1204B do not need to wait for the select signal to perform their operational function on the data input busses and can generate the appropriate values and present then on the respective outputs O1 and O2 that are coupled into the bus multiplexers 1206. Thereafter, the select signal SEL need only select which of the desired outputs to provide on the output O of the multiplexer 1206.

Physically Aware Technology Mapping (PAM)

FIGS. 9A-9C, 10A-10B, and 13A-13B illustrated aspects of physically aware technology mapping (PAM) 254. Physically aware technology mapping, also referred to herein as physically aware technology mapping, involves mapping physical gates of a technology library to the Boolean logic equations or the logic primitives, whichever is available. Generally, the goal of physically aware technology mapping is to avoid long wires (minimize wire costs) when there is a choice in mapping the logic equations and/or logic primitives into the physical gates from the technology library. A final goal of physically aware technology mapping is to go from the RTL input to placed physical gates in one shot, one process flow, without repeating prior steps.

Aspects of physical aware technology mapping (PAM) 253 include wire delay budgeting, placement driven mapping, and placement driven data path optimization. The goal of physical aware technology mapping is to ensure that the physical mapper sees a correct timing picture during synthesis. To that end, the physical mapper is timing driven. For a first cut, the wire delay budgeting in the mapper uses cluster placement. Extra delay is estimated for long wire interconnects. A timing graph can be adjusted using path-adjustment (D-d) constraints. Other aspects include still tuning or dynamic mapping.

PAM—Pre-Budgeting with Path Adjustment Constraints

Figure 9A:
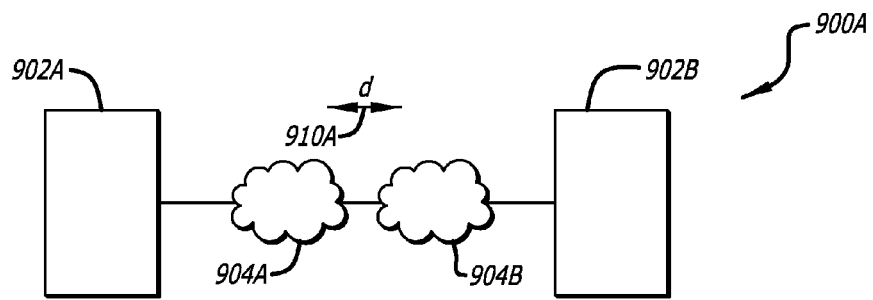
FIGS. 9A-9C are functional block diagrams to illustrate an aspect of physical aware mapping.
Figure 9B:
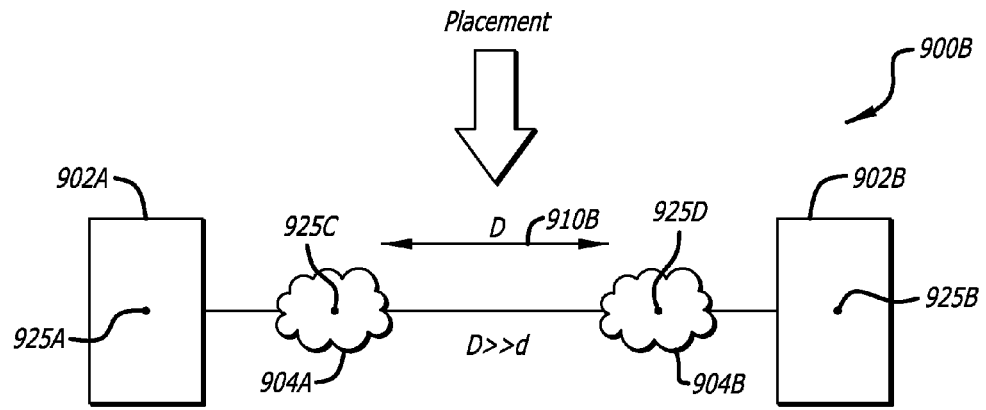
Figure 9C:
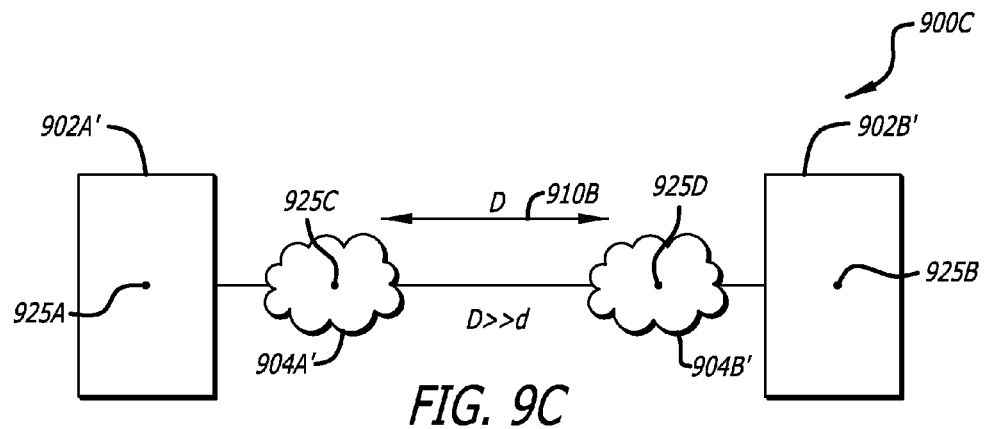

Referring now to FIGS. 9A-9C, an aspect of physical aware technology mapping is illustrated.

Pre-budgeting sets up a wire budget in advance for wire timing delay to force the physically aware mapper to work hard to achieve the same mapping. Timing delay or arrival times are calculated with and without wire delays. The difference in these two arrival times or timing delays may be used to force the mapper to select faster physical logic gates with less gate delay or greater drive capability, e.g., larger buffer to drive a higher fan-out, to compensate for the added delay of the wire. The mapping will also look to minimize wire costs. The wire costs being represented by the quantity of wires routed, the number of crossovers, as well as the total length of all wires routed. Wire delay timing is more concerned about the wire length of individual wire routes between terminals/pins.

For example, consider a flip flop with a data input having a required time (RT) constraint and logic that generates the data signal propagating into the flip-flop. In response to the placement of the logic primitives, the arrival time A0 (time delay D0) at the data input of a flip flop is calculated assuming the wire delay is zero. The arrival time Aw (time delay Dw) at the input of a flip flop is also calculated with the wire delays that are generated from the generic wire interconnects and their respective wire lengths and wire crossovers. The difference in arrival times (time delays) is calculated to determine a change $\Delta RT$ in a required time constraint at the input of the flip flop. That is, the change $\Delta RT$ in a required time constraint can be computed from the equation $\Delta RT=Aw-A0$ ($\Delta RT=Dw-D0$). The required time at the input of the flip flop is decreased by the change $\Delta RT$ in the required time constraint to force the mapper to work harder to meet the new required time. The mapper may then select faster gates along the path as a way to have less delay along the path to the input of the flip flop.

One way of accomplishing the change in the required time is to use a path adjustment constraint equal in length to the desired change in required time $\Delta RT$.

In FIG. 9A, a circuit 900A includes D flip flops 902A-902B with logic circuits 904A-904B synthesized between each with non-physical aware synthesis assuming that the logic circuitry 904A and 904B is separated by a statistical distance d 910A. However with a physical aware synthesis where placement is considered, the separation in the logic circuitry 904A and 904B substantially increases to a distance D 910B that is much greater than the statistical distance d 910A as illustrated by FIG. 9B, for example.

In FIG. 9B, a circuit 900B is illustrated with the same elements of flip flops 902A-902B and logic circuits 904A-904B. However with a physical aware synthesis the flip flops are respectively placed at coordinates 925A-925B and the logic circuits 904A-904B are respectively placed at coordinates 925C-925D. The large distance D 910B between the logic circuits 904A-904B can contribute to wire timing delay to the overall timing delay of signals launched by the flip flop 902A and captured by the flip flop 902B. It may be desirable to compensate for the wire timing delay due to the large distance D between the logic circuits. One way to do so is to select faster logic gates in the logic circuits 904A-904B and perhaps different flip flops 902A-902B that can more quickly launch a signal and wait longer to capture a signal at the opposite end.

Assuming the distance D 910B is much greater than the distance d 910A, the desired change in required time $\Delta RT$ may be computed by dividing the distance D by the predetermined average time per unit length of wire interconnect (Kw), $\Delta RT=D/Kw$. Adjusting the required time RT by the desired change in required time $\Delta RT$ causes the mapper to reconsider the speed and strength of logic gates that are used in the logic circuits 904A-904B.

As illustrated in FIG. 9B, the mapper generates a circuit 900C with the logic elements of flip flops 902A'-902B' and logic circuits 904A'-904B' providing the same functionality as circuit 900B. The flip flops 902A'-902B' and logic circuits 904A'-904B' are similarly placed at coordinates 925A-925B and 925C-925D, respectively. However, the chosen circuits elements differ in circuit 900C to compensate for the desired change in required time.

The physical circuit elements of the logic circuits 904A'-904B' in circuit 900C may be stronger and/or faster. For example, an inverter in circuit 900B may be a single strength size (1x) with a 2 micron p-channel transistor width, for example. The inverter in circuit 900C with the same logic functionality may be a double strength size (2x) with a 4 micron p-channel transistor width, for example. The double strength size of the inverter in circuit 900C may speed up the generation of a signal at its output and compensate for the change in required time. Alternatively or additionally, the physical circuit elements of the flip flops 902A'-902B' in circuit 900C may be stronger and/or faster than those of circuit 900B.

Due to the change in the required time RT, the mapper is forced to select faster gates for the logic circuits and optionally flip flops along the path so that when circuits are actually placed, the desired required time has a greater likelihood of being satisfied.

PAM—Merge

When mapping the Boolean logic equations into logic gates it may be determined if a plurality of the same type of logic gate (e.g., AND, OR, XOR, NAND, NOR, XNOR) can be mapped into a single logic gate, referred to as a merge during mapping. If so, two or more of the plurality of logic gates are selected for being actually mapped into a single logic gate. The selection is made in response to the wire lengths to primarily minimize timing delay and secondarily minimize wire lengths and cross overs. Accordingly, during mapping, there may be a dynamic timing update with wire delay during the mapping of the logic primitives into the circuit logic gates.

If NAND gates are being used in a tree of a plurality of NAND gates to accomplish a large NAND, it is desirable to avoid merging NAND trees that are far away so that extra long wires are not introduced. During the mapping, physical aware buffering is provided during the merge process. If the fan-out load is too great on the merged logic gate, a buffer may be used to buffer the fan-out load taking into consideration extra gate delay and any wire cross overs. A data path requiring an adder may be replaced with random gates instead of a full adder structure. With the placement and wire information, timing and wire costs evaluations are made between using a full adder structure and random gates.

Figures 10A, 10B, 10C:
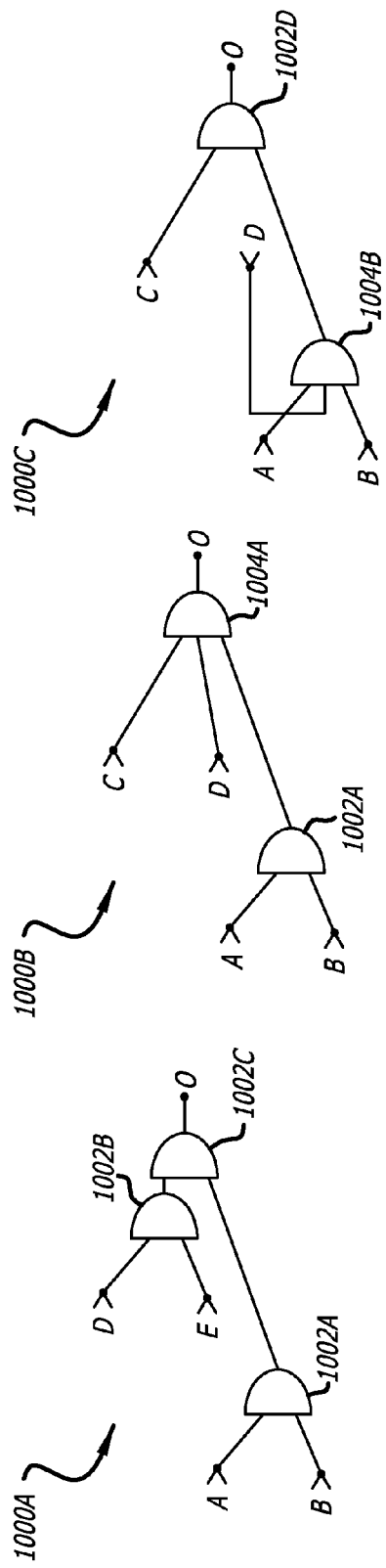
FIGS. 10A-10C are schematic diagrams of circuits to illustrate another aspect of physical aware mapping.

Referring now to FIGS. 10A-10B, another aspect of physical aware technology mapping, a merge during mapping, is illustrated.

In FIG. 10A, a circuit 1000A is illustrated having three two-input AND gates 1002A-1002C coupled together as shown. During mapping of the logic primitives into the circuit, it may be determined that AND gates 1002B and 1002C can be merged together into one three-input AND gate. Alternatively, AND gates 1002A and 1002C could be merged together into one three-input AND gate. However, the merger of AND gates 1002A and 1002C would cause longer signal wire lengths for input A and input B. Thus, the merge of AND gates 1002B and 1002C together into one three-input AND gate is more likely.

In FIG. 10B, the circuit 1000B is illustrated with the two input AND gate 1002A coupled to a three input AND gate 1004A. The circuit 1000B provides the same logical functionality of the circuit 1000A. Thus, the AND gates 1002B and 1002C can be merged together to form the three input AND gate 1004A.

In FIG. 10C, circuit 1000C is illustrated with a three input AND gate 1004B coupled to a two input AND gate 1002D as shown. Circuit 1000C generates the same logical functionality output and it's output O has circuits 1000B and 1000A. However, the three input AND gate 1004B receives input signals A, B and D. This may be because the signal D is generated closer to the AND gate 1004B. Alternatively, input signal D has an arrival time much less than the arrival time of input C, which is beneficial to have the output of the AND gate 1004B generated sooner if possible.

PAM—Dynamic Timing Update

Long wires routed between terminals/pins can effect the required time at given terminals/pins of a serial series of logic primitives backwards along a path between flip flops. To compensate for wire delay, the required time at the terminals/pins can be dynamically adjusted for the segments of wire delay between logic primitives from final output to first input. The mapper can select faster gates, from output to input, to more quickly drive the signal to the given terminal/pin during the mapping of the Boolean logic equations into physical logic gates.

Figure 13A:
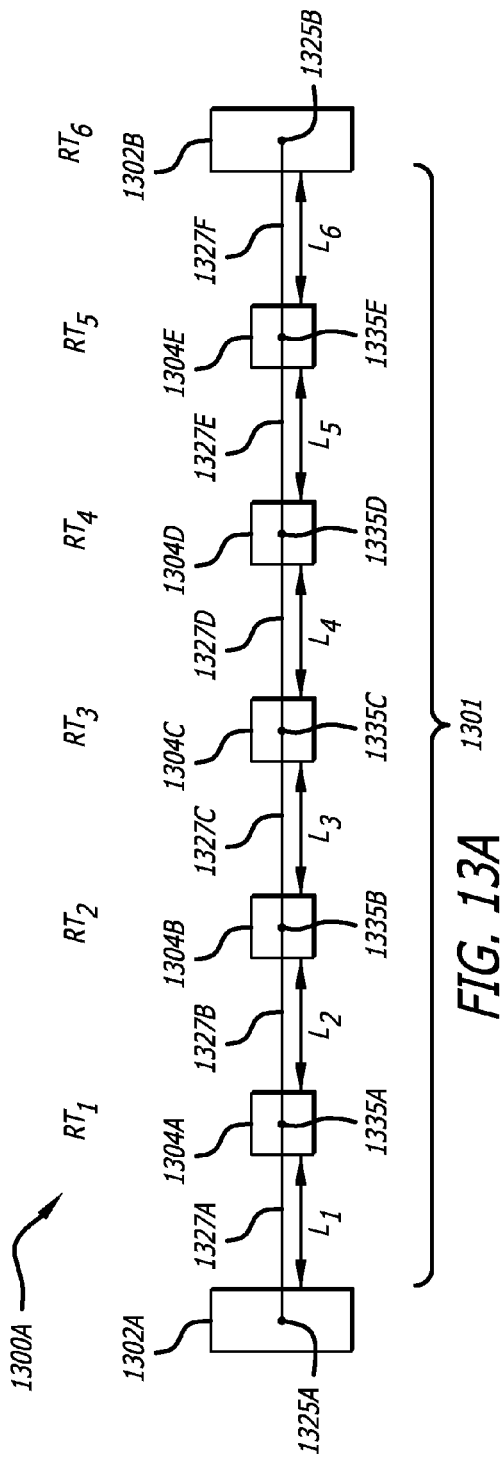
FIGS. 13A-13B are schematic diagrams of circuits to illustrate another aspect of physical aware mapping.
Figure 13B:
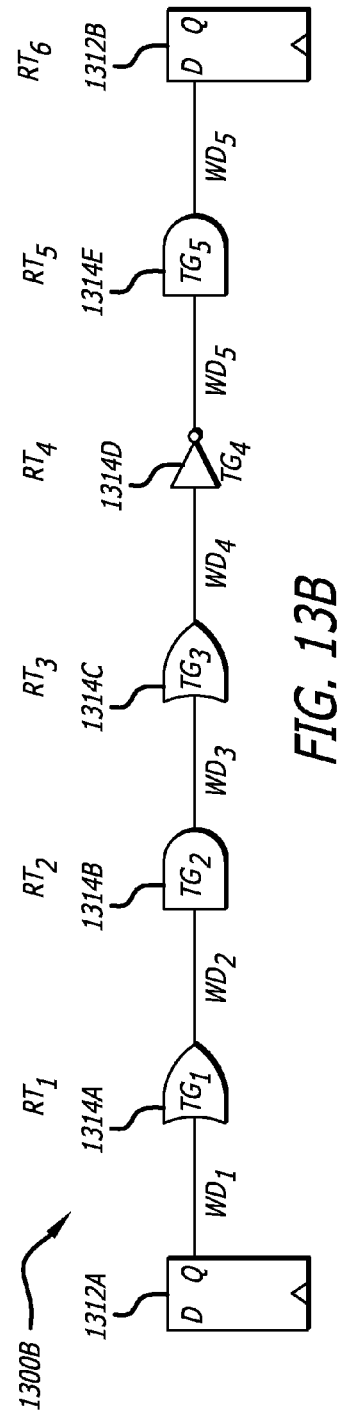

Reference is now made to FIGS. 13A-13B illustrating a cluster 1300A of logic primitives 1304A-1340E and sequential primitives 1302A-1302B that are to be mapped respectively into a cluster 1300B of mapped or physical logic gates 1314A-1314E and flip flops 1312A-1312B. In response to the placement of the logic primitives, each path 1301 between flip-flops 1302A-1302B is analyzed in a backward fashion from the output of the final or last logic primitive 1304E into a capturing flip flop 1302B back to the input of initial logic primitive 1304A driven by an output of the launching flip flop 1302A.

With the final or last logic primitive 1304E in the path 1301 having a last required time RT6 at the input to the D flip flop 1312B, the mapper maps the last logic primitive 1304E into the last mapped or physical gate 1314E in a series of mapped or physical gates between the mapped or physical flip flops 1312A-1312B.

The timing behind the last mapped logic gate 1314E is analyzed to include the wire delay in the generic wire 1327E between logic primitives. It is then desirable to map the previous logic primitive 1304E in the series into the prior gate 1314D in the series between the flip flops 1312A-1312B.

The last required time RT6 of the final or last gate 1314E at the input to the flip flop 1312B is then used to compute the required time RT5 for the prior gate at the input to the gate 1314E. Given that the logic primitives were placed defining wire lengths L1 through L6, the wire delay Time TWD5 between the last primitive 1304E and the prior primitive 1304D is computed from the wire length L5 between each (TWD5=L5×delay time per unit length). The required time RT5 for the prior gate 1314D is computed by subtracting the wire delay time TWD5 between the logic primitives 1304E-1304D and the gate delay TG5 of the final gate 1314E from the last required time RT6 of the final gate 1314E. RT5=RT6−(TWD5+TG5). With the computed required time RT5 for the prior gate 1314D, the prior gate 1314D can be mapped into the layout from the logic primitive 1304D in response to its computed required time RT5.

This process can continue for each prior gate in the path between flips flops until the initial gate 1314A in the path is finally mapped from its logic primitive 1304A into the layout.

As another example consider the mapping the last logic primitive 1304A into the initial physical gate 1314A in the series. It is desirable to computer the required time RT2 for the prior gate 1314A from the last required time RT3 for the following gate 1314B. The wire delay Time TWD2 between the following primitive 1304B and the initial primitive 1304A is computed from the wire length L2 between each (TWD2=L2 times delay time per unit length). The required time RT2 for the prior gate 1314A is computed by subtracting the wire delay time TWD2 between the logic primitives 1304A-1304B and the gate delay TG2 of the following gate 1314B from the required time RT3 of the following gate 1314B. RT2=RT3−(TWD2+TG2). With the computed required time RT2 for the prior gate 1314A, the prior gate 1314A can be mapped into the layout from the logic primitive 1304A in response to its computed required time RT2.

Guided Placement

Aspects of guided placement 256 include an initial trial placement of gates, a weighting of specific nets, placement guides, and soft groups. The result of this is placement information that can be used by placement and routing tools to physically place the physical logic gates in an IC layout and route physical wire interconnect in the layout between the pins/terminals. The initial trial placement of gates consists of the X,Y coordinates of all the generic gates that were placed into the floorplan. Placement guides consists of regions where specific gates are preferably placed. Soft groups may consist of groupings of gates that repeated over and over again and can be placed as a group.

During the physically aware synthesis, it may be determined that certain nets require more careful routing and placement of gates, such as being in a critical path or having an extended wire length. Accordingly, these nets may be weighted more heavily over others so that gates are placed more carefully and wire interconnect is routed more carefully to reduce time delay, such as being made as short as possible and/or avoid wire cross overs. The weighted nets are included in the placement information that is passed to a placement software tool and routing software tool.

Computing Apparatus

Figure 11A:
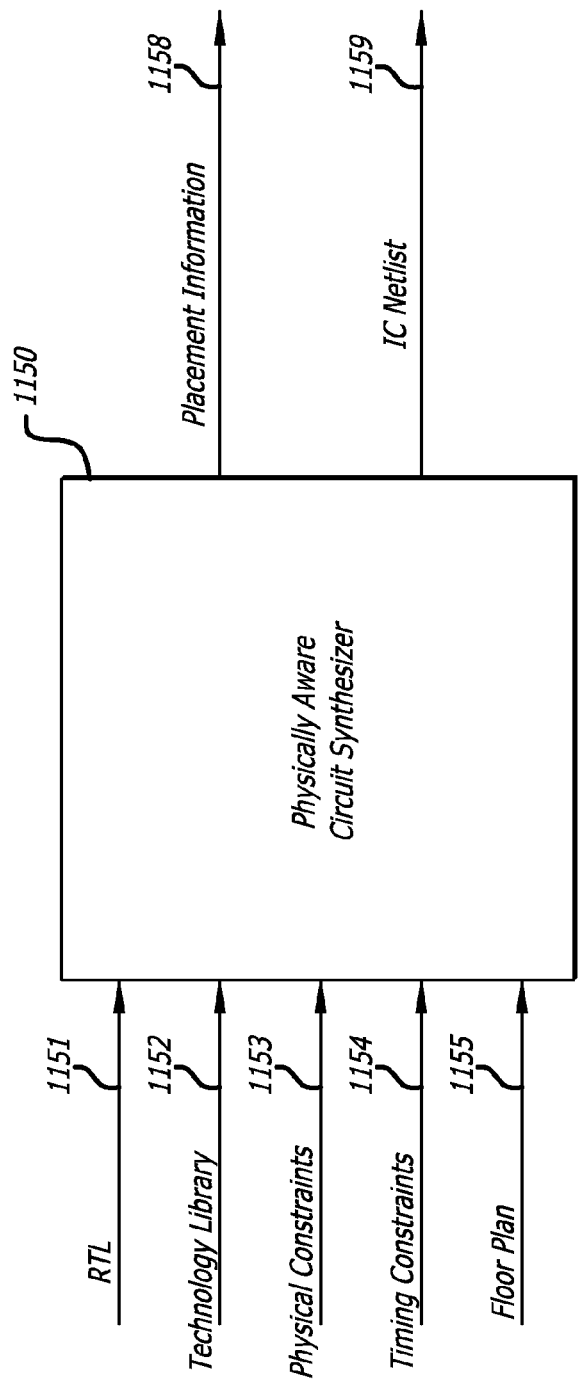
FIG. 11A illustrates a functional block diagram of a physically aware circuit synthesizer.

Referring now to FIG. 11A, a block diagram of a physically aware circuit synthesizer 1150 is illustrated. The physically aware circuit synthesizer 1150 receives register transfer level (RTL) input file 1151, a technology library 1152, a physical constraints file 1153, a timing constraints file 1154, and a floorplan 1156 of the integrated circuit design.

The register transfer level (RTL) input file 1151 describes the desired functionality of an integrated circuit design. The technology library file includes a description of the physical logic gates that are available from a given semiconductor foundry for manufacture of the IC design. The physical logic gates are placed within the IC layout as denoted by X,Y coordinates in the layout. The physical constraints file 1153 includes physical constraints that govern placement of circuits into the layout of the IC design. The timing constraints file 1154 includes timing constraints that establish the performance requirements of the IC design. The floorplan 1156 of the integrated circuit design describes the position of the large upper level functional blocks that sets the initial layers of hierarchy of an IC design. The floorplan 1156 may be used to distribute the design work between IC designers in generating the RTL functionality for each functional block.

In response to the inputs, the physically aware circuit synthesizer 1150 generates placement information 1158 that includes the initial placement information of mapped physical gates in the layout and guided placement information. The mapped physical gates and circuits from the technology library file. The physically aware circuit synthesizer 1150 further generates an IC netlist 1159 associated with the IC layout 1159. The IC netlist 1159 is used by a router, for example, to route wire interconnects between terminals/pins of the placed circuits in the IC layout 1159.

The physically aware circuit synthesizer 1150 includes software code or instructions that are executed by one or more processors of a computer system or a network of a plurality of computer systems.

Figure 11B:
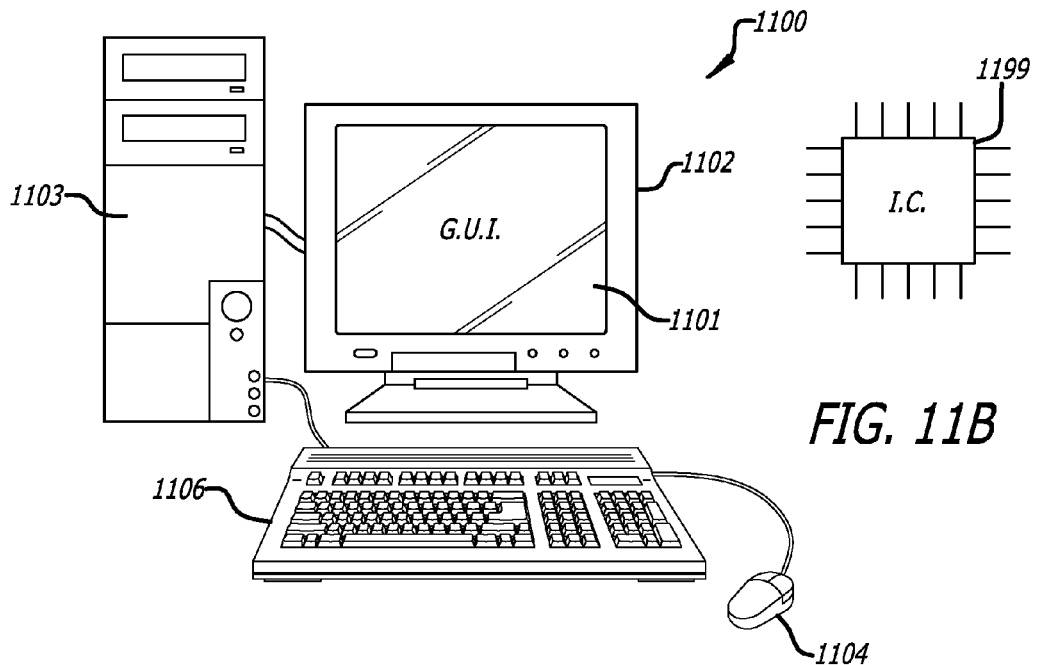
FIG. 11B illustrates a computer system with a graphical user interface displayed by a display device that may be used to design integrated circuits.

Referring now to FIG. 11B, a computer system 1100 is illustrated for designing an integrated circuit 1199. In accordance with the embodiments of the invention, the computer system 1100 includes a central processing unit (CPU) 1103 to execute instructions of a software program to display a graphical user interface (GUI) 1101 on an output device 1102 (e.g., a display device or monitor). The computer system 1100 further includes at least one input device 1104, such as a mouse or trackpad, to interact with the GUI 1101. The input device 1104 may be directly coupled to the CPU 1103 or may couple the CPU through a second input device 1106, such as a keyboard. FIG. 11B, described further below, illustrates a functional block diagram of the computer system 1100 to execute instructions of the software program and display the graphical user interface 1101 to a user for physically aware.

Figure 11C:
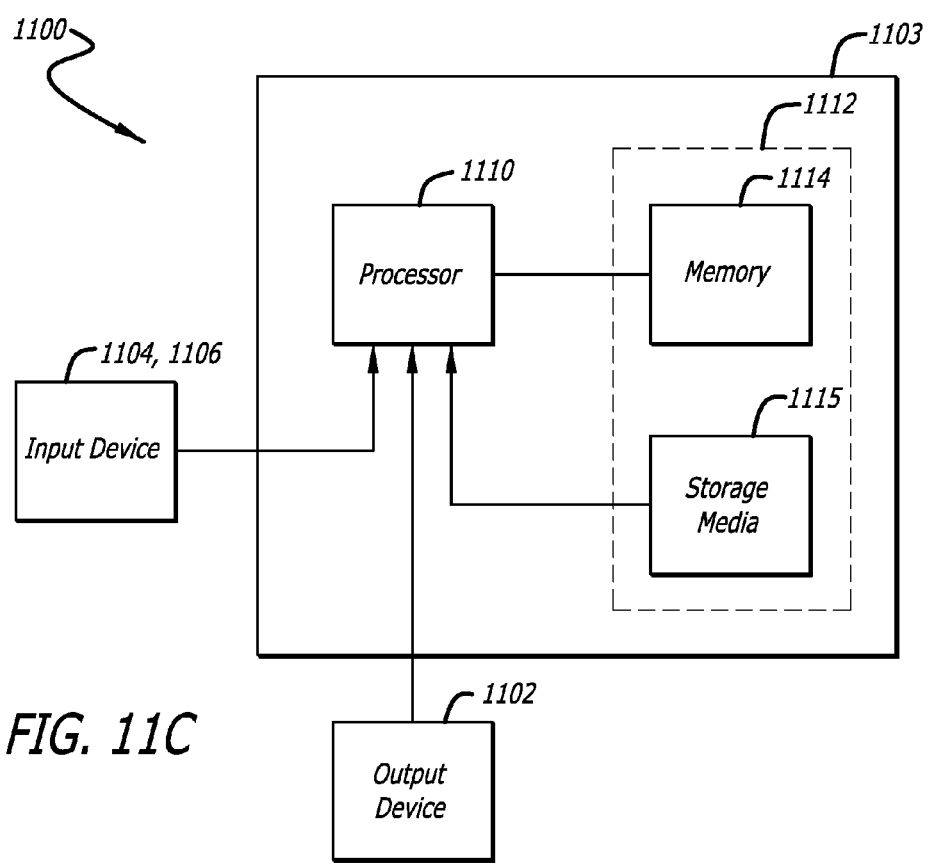
FIG. 11C is a functional block diagram of the computer system that executes the instructions to perform the processes for physically aware logic synthesis.

Referring now to FIG. 11C, an exemplary computing system or apparatus 1100 is illustrated. The exemplary computing apparatus X00 is adapted to perform electronic computer aided design (ECAD) and may be used to execute instructions or code of software programs to perform the processes or elements of the methods disclosed herein. The computing apparatus 1100 includes an input device 1101, such as a keyboard, mouse, Ethernet or other communications port; an output device 1102, such as a monitor, speakers, a printer, communications port, or a writeable media drive; a processor 1110; and a storage device 1112 coupled together as shown. The storage device 1112 may include one or more of a memory 1114, such as a volatile memory like RAM, SDRAM, DDR, DDR2, DDR3; and a storage media 1115. The storage media 1115 may comprise a non-volatile memory such as a hard drive, a solid-state drive, and the like. In some embodiments, as is known in the art, the storage media may be located on another computing device across a network (not shown). Instructions may be loaded from the storage media into the memory. The processor may retrieve instructions from the storage media or memory and execute the instructions to perform the operations described herein.

Included in the storage device 1112 is a set of processor executable instructions that, when executed by the processor 1110 configure the computing apparatus to provide the graphical user interface in a manner consistent with the methods disclosed herein. The clock tree planning user interface and its layout windows shown in the Figures may be displayed on the output device 1102, such as a monitor or a display device, in response to processor or machine readable instructions.

In one embodiment of the invention, the clock topology planning software may be part of a logic synthesis software tool (e.g., the RTL Compiler tool) whose instructions are executed by the processor. In another embodiment of the invention, the clock topology planning software may be a stand alone software tool with instructions that are executed independently by the processor.

The computing system includes a processor, a memory, a removable media drive, and a hard disk drive. The processor within the computer executes instructions stored in a machine-readable storage device such as the hard disk drive or a removable storage device (e.g., an optical medium (compact disk (CD), digital video disk (DVD), etc.), a magnetic medium (magnetic disk, a magnetic tape, etc.), or a combination of both.

When implemented in software, the elements of the embodiments of the invention are essentially the program, code segments, or instructions to perform the necessary tasks. The program, code segments, or instructions can be stored in a processor readable medium or storage device that can be read and executed by a processor. The processor readable medium may include any medium that can store information. Examples of the processor readable medium include an electronic circuit, a semiconductor memory device, a read only memory (ROM), a flash memory, an erasable programmable read only memory (EPROM), a floppy diskette, a CD-ROM, an optical disk, and a magnetic disk. The program or code segments may be downloaded via computer networks such as the Internet, Intranet, etc. and stored in the processor readable medium or storage device.

When implemented as an electronic computer aided design (ECAD) system, the elements of the embodiments of the invention include one or more processor to execute the program, code segments, or instructions that may be stored in a processor readable medium or storage device to perform the tasks or functions of a method or process. The one or more processors may be specifically adapted to electronic computer aided design including processing logic that may comprise hardware (e.g., circuitry, dedicated logic, etc.), software, or a combination of both.

Some portions of the preceding detailed description may have been presented in terms of algorithms and symbolic representations that perform operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities may take the form of electrical (e.g., current or voltage) or magnetic signals capable of being stored, transferred, combined, compared, and otherwise manipulated. It has proven convenient at times, principally for reasons of common usage, to refer to these signals as bits, values, levels, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, processing logic, or similar electronic computing device, that automatically or semi-automatically manipulates and transforms data represented as physical (electronic) quantities within the computer system's registers and memories into other data similarly represented as physical quantities within the computer system memories or registers or other such information storage, transmission or display devices.

Additionally, the embodiments of the invention are not described with reference to any particular programming language. It will be appreciated that a variety of programming languages may be used to implement the teachings of the embodiments of the invention as described herein.

CONCLUSION

Thus, it is seen that a system, method, and apparatus for physically aware circuit synthesis are disclosed. It will be appreciated that the embodiments of the invention can be practiced by other means than that of the above-described embodiments, which are presented in this description for purposes of illustration and not of limitation. The specification and drawings are not intended to limit the exclusionary scope of this patent document. It is noted that various equivalents for the particular embodiments discussed in this description may be practice by the claimed invention as well. That is, while specific embodiments of the invention have been described, it is evident that many alternatives, modifications, permutations and variations will become apparent in light of the foregoing description. Accordingly, it is intended that the claimed invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of designing an integrated circuit, the method comprising:
translating a register transfer level (RTL) input file describing an integrated circuit design into a plurality of Boolean logic equations;
translating the plurality of Boolean logic equations into a plurality of logic primitives;
placing the plurality of logic primitives into a floorplan of the integrated circuit design, the placement of the plurality of logic primitives defining wire interconnects between the plurality of logic primitives;
calculating wire timing delays associated with the defined wire interconnects in response to placement coordinates of the placement of the plurality of logic primitives; and
optimizing each of the plurality of Boolean logic equations in response to the wire timing delays associated with the defined wire interconnects;
wherein one or more of the translating, the placing, the calculating, and the optimizing are performed with a processor.

2. The method of claim 1, wherein
the optimizing of each of the plurality of Boolean logic equations includes
determining that the wiring timing delays do not meet a timing requirement.

3. The method of claim 2, wherein
the optimizing of each of the plurality of Boolean logic equations is further in response to wire congestion of the defined wire interconnects determined from the placement and an area of the plurality of logic primitives.

4. The method of claim 2, wherein
the defined wire interconnects are represented by airlines extending between placement coordinates of the plurality of logic primitives.

5. The method of claim 1, further comprising:
grouping the plurality of logic primitives into one or more clusters of logic primitives;
wherein the placement of the plurality of logic primitives into the floorplan is responsive to the one or more clusters of logic primitives.

6. The method of claim 1, further comprising:
receiving a physical constraint file including physical constraints, a timing constraints file including timing constraints, a technology library including physical logic gates, and the floorplan of the integrated circuit design;
wherein the placement of the plurality of logic primitives is responsive to the physical constraints, the timing constraints, the physical logic gates, and the floorplan.

7. The method of claim 6, further comprising:
mapping the Boolean logic equations into logic gates in response to the technology library and the wire timing delays.

8. The method of claim 7, wherein the mapping of the Boolean logic equations into logic gates includes
in response to the placement of the logic primitives,
calculating the arrival time at an input of a flip flop with zero wire timing delay assuming that wire timing delay in the wire interconnections to the input is zero
calculating the arrival time at the input of the flip flop with non-zero wire timing delay determined from wire lengths of the wire interconnections to the input;
calculating the difference in the arrival times to the input of the flip flop with the zero wire timing delay and the non-zero wire timing delay; and
decreasing the required time at the input of the flip flop to map different physical gates to the logic primitives to compensate for the non-zero wire timing delay.

9. The method of claim 7, wherein the mapping of the Boolean logic equations into logic gates includes
in response to the placement of the logic primitives,
analyzing a path from output to input between flip flops;
mapping the last gate in a series of gates, the last gate having a last required time;
analyzing timing of the input signals to the last gate including wire delay;
reducing the last required time by the gate delay of the last gate and the wire delay into the last gate to compute a required time for a prior gate in the series;
mapping the prior gate in the series of gates in response to the computed required time for the prior gate.

10. The method of claim 7, wherein the mapping of the Boolean logic equations into logic gates includes
determining if a plurality of logic gates with the same Boolean logic type can be mapped into a single logic gate of the same Boolean logic type; and
it is determined that a plurality of logic gates with the same Boolean logic type can be mapped into a single logic gate of the same Boolean logic type, the mapping further includes
in response to the wire lengths, selecting two or more of the plurality of logic gates to be mapped into the single logic gate to primarily minimize timing delay and secondarily minimize wire lengths and wire cross overs.

11. The method of claim 6, wherein the optimizing of the Boolean logic equations includes
determining if one or more Boolean logic equations translate into a large multiplexer having a number of inputs greater than the largest multiplexer in the technology library; and
it is determined that one or more Boolean logic equations translate into a large multiplexer and the optimizing further includes
splitting the large multiplexer into a plurality of smaller multiplexers each of which is available in the technology library.

12. The method of claim 11, wherein the optimizing of the Boolean logic equations further includes
selecting either a one hot multiplexer or a binary multiplexer as the plurality of smaller multiplexers in response to constraints of wire length, wire congestion, and wire timing delay.

13. The method of claim 12, wherein the optimizing of the Boolean logic equations includes
selecting the binary multiplexer as the plurality of smaller multiplexers when wire length and wire congestion are more critical than timing delay.

14. The method of claim 12, wherein the optimizing of the Boolean logic equations includes
selecting the one hot multiplexer as the plurality of smaller multiplexers when the timing delay is more critical than wire length and wire congestion.

15. The method of claim 6, wherein the optimizing of the Boolean logic equations includes
determining if one or more Boolean logic equations translate into a large AND gate, a large OR gate, a large XOR gate, or other large Boolean logic gate having a number of inputs greater than that the largest number of inputs of equivalent functioning logic gates that are available in the technology library; and it is determined that one or more Boolean logic equations translate into a large Boolean logic gate and the optimizing further includes
splitting the large Boolean gate into a plurality of smaller Boolean gates in the technology library; and
rebalancing the tree shape of the plurality of smaller Boolean gates including the associated wire lengths to primarily minimize timing delay and secondarily minimize wire lengths and wire cross overs.

16. The method of claim 6, wherein the optimizing of the Boolean logic equations includes
determining if a first logic gate has a fan-out exceeding a predetermined fan-out number; and
the first logic gate has a fan-out exceeding the predetermined fan-out number and the optimizing further includes
analyzing the fan-out of the first logic gate having one or more first inputs and a first output coupled to the fan-out to determine how to split up the fan-out into a first split fan-out and a second split fan-out to reduce wire crossovers, minimize congestion and improve timing, wherein the first output of the first logic gate to couple to the first split fan-out to drive logic signals into the first split fan-out; and
duplicating the logic primitive associated with the first logic gate to form a second logic gate similar to the first logic gate, the second logic gate having one or more second inputs respectively coupled to the one or more first inputs and a second output coupled to the second split fan-out to drive similar logic signals into the second split fan-out.

17. The method of claim 6, wherein the optimizing of the Boolean logic equations includes
determining if a plurality of interconnected logic gates has at least one output with a fan-out exceeding a predetermined fan-out number;
it is determined that at least one output of one of the plurality of interconnected logic gates has a fan-out exceeding the predetermined fan-out number and the optimizing includes
analyzing the fan-out of the one of the plurality of interconnected logic gates to determine how to split up the fan-out into at least a first split up fan-out and a second split up fan-out to reduce wire crossovers, minimize wire congestion, and improve signal timing;
reducing the fan-out coupled to the output of the one of the plurality of interconnected logic gates down to the first split up fan-out; and
duplicating at least once the one of the plurality of interconnect logic gates with inputs coupled in parallel together to the one of the plurality of interconnected logic gates and an output coupled to the second split up fan-out.

18. The method of claim 6, wherein the optimizing of the Boolean logic equations includes
determining if a flip flop has a fan-out exceeding a predetermined fan-out number;
it is determined that a flip-flop has a fan-out exceeding the predetermined fan-out number and the optimizing includes
analyzing the fan-out to determine how to split up the fan-out into at least a first split up fan-out and a second split up fan-out to reduce wire crossovers to minimize congestion and improve timing;
reducing the fan-out coupled to the output of the flip flop down to the first split up fan-out; and
duplicating the flip flop into a duplicated flip-flop with inputs coupled in parallel together and an output coupled to the second split up fan-out.

19. The method of claim 6, wherein the optimizing of the Boolean logic equations includes
determining if a signal driving a control input of a bus multiplexer that is a part of a cluster of logic operators has a late arrival time;
it is determined that the signal driving the control input of the bus multiplexer has a late arrival time and the optimizing includes
optimizing the cluster by avoiding sharing of the logic operators.

20. The method of claim 6, wherein the optimizing of the Boolean logic equations includes
determining if a signal driving a control input of a bus multiplexer that is a part of a cluster including a logic operator has a late arrival time;
it is determined that the signal driving the control input of the bus multiplexer has a late arrival time and the optimizing includes
optimizing the cluster by duplicating the logic operator and moving the logic operator and the duplicated logic operator from an output side of the bus multiplexer to an input side of the bus multiplexer.

21. The method of claim 6, wherein the optimizing of the Boolean logic equations includes
determining if a plurality of the same type of logic gates are collapsible logic gates that can be collapsed into a single logic gate of the same type; and
it is determined that at least two or more of the same type of logic gates are collapsible logic gates that can be collapsed into a single logic gate of the same type, the optimizing further includes
selecting two or more collapsible logic gates of the plurality of logic gates and
collapsing the selected two or more collapsible logic gates into the single logic gate in response to the wire lengths to primarily minimize timing delay and secondarily minimize wire lengths and wire cross overs.

22. The method of claim 6, wherein the optimizing of the Boolean logic equations includes
amongst a plurality of different ways to share an output of a Boolean logical function, determining if an output of a Boolean logic equation is a sharable output that can be shared with at least two logic primitives;
it is determined that at least one output of a Boolean logic equation is a sharable output that can be shared with at least two logic primitives, and the optimizing further includes
selecting to share the output with the logic primitive of the at least two logic primitives having a shortest wire length to primarily minimize timing delay and secondarily minimize wire cross overs.

23. The method of claim 1, wherein the translating of the register transfer level (RTL) input file into the plurality of Boolean logic equations includes
receiving the register transfer level (RTL) input file; and
parsing and translating the RTL input file into the plurality of Boolean logic equations.

24. A system for synthesizing circuits of an integrated circuit design, the system comprising:
a processor to execute instructions; and a storage device coupled to the processor, the storage device storing instructions for execution by the processor to cause the processor to
translate a register transfer level (RTL) input file describing an integrated circuit design into a plurality of Boolean logic equations;
translate the plurality of Boolean logic equations into a plurality of generic logic gates;
place the plurality of generic logic gates into a floorplan of the integrated circuit design, the placement of the plurality of generic logic gates defining wire interconnects between the plurality of generic logic gates;
calculate wire timing delays associated with the defined wire interconnects in response to placement coordinates of the placement of the plurality of logic gates; and
optimize each of the plurality of Boolean logic equations in response to the wire timing delays associated with the defined wire interconnects.

25. The system of claim 24, wherein
the storage device stores further instructions for execution by the processor to cause the processor to
determine whether the wiring timing delays meet a timing requirement.

26. A computer readable product for synthesizing circuits of an integrated circuit design, the computer readable product comprising:
a non-transitory computer readable storage medium storing instructions including
instructions to translate a register transfer level (RTL) input file describing an integrated circuit design into a plurality of Boolean logic equations;
instructions to translate the plurality of Boolean logic equations into a plurality of generic logic gates;
instructions to place the plurality of generic logic gates into a floorplan of the integrated circuit design, the instructions to place defining wire interconnects between the plurality of generic logic gates;
instructions to calculate wire timing delays associated with the defined wire interconnects in response to placement coordinates of the placement of the plurality of logic primitives; and
instructions to optimize each of the plurality of Boolean logic equations in response to wire timing delays associated with the defined wire interconnects.

27. The computer readable product of claim 26, wherein the instructions stored in the storage device further include:
instructions to determine whether the wiring timing delays meet a timing requirement.

* * * * *